United States Patent
Hara et al.

(10) Patent No.: US 6,517,744 B1
(45) Date of Patent: Feb. 11, 2003

(54) CURING COMPOSITION FOR FORMING A HEAT-CONDUCTIVE SHEET, HEAT-CONDUCTIVE SHEET, PRODUCTION THEREOF AND HEAT SINK STRUCTURE

(75) Inventors: Takeo Hara, Tokyo (JP); Shin-ichiro Iwanaga, Tokyo (JP); Hozumi Sato, Tokyo (JP); Ryoji Setaka, Tokyo (JP)

(73) Assignee: JSR Corporation, Tokyo (JP)

( * ) Notice: Subject to any disclaimer, the term of this patent is extended or adjusted under 35 U.S.C. 154(b) by 147 days.

(21) Appl. No.: 09/711,528

(22) Filed: Nov. 14, 2000

(30) Foreign Application Priority Data

| Nov. 16, 1999 | (JP) | ............................................ | 11-325757 |
| Feb. 4, 2000 | (JP) | ............................................ | 2000-027738 |
| Mar. 22, 2000 | (JP) | ............................................ | 2000-080463 |
| Mar. 31, 2000 | (JP) | ............................................ | 2000-098943 |
| May 1, 2000 | (JP) | ............................................ | 2000-132588 |
| May 26, 2000 | (JP) | ............................................ | 2000-156693 |

(51) Int. Cl.$^7$ .......................... H01B 1/24; B29C 67/24; C21D 1/04
(52) U.S. Cl. ...................... 252/506; 264/429; 264/437; 264/612; 522/3; 522/4; 148/108
(58) Field of Search ................................. 252/503, 506, 252/511, 62, 54; 148/108; 522/3, 4; 264/427, 429, 437, 612

(56) References Cited

U.S. PATENT DOCUMENTS 5,224,030 A 6/1993 Banks et al.
5,316,080 A 5/1994 Banks et al.
5,834,337 A 11/1998 Unger et al.
6,110,399 A * 8/2000 McArdle et al. ............ 252/513

FOREIGN PATENT DOCUMENTS

WO    WO 98/40431    9/1998

OTHER PUBLICATIONS

Derwnt Publications, AN 2000–649391/63, JP 2000–191998, Jul. 11, 2000.

Derwent Publications, AN 87–147673, JP 62–086054, Apr. 20, 1987.

* cited by examiner

Primary Examiner—Mark Kopec
(74) Attorney, Agent, or Firm—Oblon, Spivak, McClelland, Maier & Neustadt, P.C.

(57) ABSTRACT

A heat-conductive sheet comprising a cured or semi-cured binder wherein a carbon fiber is orientated in the direction of the thickness of the heat-conductive sheet. This heat-conductive sheet exhibits a high anisotropic heat conductivity along the direction of the thickness thereof to thereby enable efficiently releasing heat from a heating element such as a semiconductor element or semiconductor package. Moreover, the heat-conductive sheet is excellent in not only heat resistance, durability and mechanical strength but also adherence to the heating element.

5 Claims, 6 Drawing Sheets

(a)

(b)

CURING COMPOSITION FOR FORMING A HEAT-CONDUCTIVE SHEET, HEAT-CONDUCTIVE SHEET, PRODUCTION THEREOF AND HEAT SINK STRUCTURE

FIELD OF THE INVENTION

The present invention relates to a curing composition for forming a heat-conductive sheet, a heat-conductive sheet, a process for producing the same, a method of bonding or adhering with the use of the heat-conductive sheet and a heat sink structure.

BACKGROUND OF THE INVENTION

In accordance with the enhancement of the performance of electrical or electronic equipment, there is a trend toward an increase of the number of electrodes used in semiconductor elements and toward an increase of the power consumption by semiconductor elements. Therefore, it is now of importance to efficiently release heat generated by parts of the electrical or electronic equipment.

In order to efficiently carry out the heat sink from semiconductor packages or semiconductors per se, attempts have been made to furnish them with a heat sink device or to effect a heat sink by means of a wiring board having'semiconductor elements mounted thereon. For example, the heat sink from semiconductor packages has generally been performed by natural convection over the surface of heating element body or forced convection by means of a fan disposed in the unit. This system has, however, a drawback in that, when the calorific value is increased in accordance with the enhancement of the function of semiconductor packages, the heat sink capability becomes unsatisfactory to thereby disenable surely preventing any deterioration of the performance of the semiconductor packages. Further, a system comprising a heat sink pressed against the surface of semiconductor packages so as to increase the heat sink by convection has been provided. In this system, however, the contact area of the mutually pressed surfaces of the semiconductor packages and the heat sink is -reduced because of the occurrence of clearance to thereby cause a problem in the exertion of heat sink effect as designed. Accordingly, for example, in the joining of a heat sink to semiconductor packages, it is performed to interpose, for example, a heat-conductive resin sheet therebetween and to, while adhering the semiconductor packages and the heat sink to each other, effectively attain a heat sink. Further, for example, in the joining of a semiconductor element to a heat spreader to be brought into contact therewith, it is performed to interpose a heat-conductive adhesive therebetween and to, while maintaining the bonding of the semiconductor element and the heat spreader to each other, effect the heat sink from the semiconductor element.

As a resin composition for heat conductivity increase or the like to be interposed between the semiconductor element or semiconductor package and the heat sink, for example, a silicone rubber sheet of a claylike thermocuring bonding type is employed in Japanese Patent Laid-open Publication No. 5(1993)-326916. This silicone rubber sheet has a drawback in that the heat conductivity thereof is not satisfactory from the viewpoint of coping with the increase of power consumption being encountered by semiconductor elements. For increasing the heat conductivity, it is performed to randomly disperse metal particles of high heat conductivity in the resin sheet of, for example, silicone rubber. For attaining a further increase of the heat conductivity, it is being tried to load the resin sheet with metal particles in high dispersion and in high filling ratio. However, even if the resin sheet is loaded with metal particles in high dispersion and in high filling ratio, there remain problems not only such that heat is diffused in random directions to thereby disenable satisfactorily increasing the heat conduction between the semiconductor element and the heat sink but also such that the loading with metal particles in high filling ratio causes the resin sheet to have poor tensile strength and poor elasticity and is further likely to cause the resin moldability to deteriorate.

Therefore, there has been a demand for the development of a heat-conductive sheet which is excellent in the anisotropic heat conduction in the direction of the thickness of the sheet (subject 1).

Japanese Patent Laid-open Publication No. 52(1977)-128465 discloses a process for obtaining an electrically conductive sheet while orientating fibers in the direction of the thickness of the sheet by the action of magnetic field.

On the other hand, when a semiconductor package is assembled in, for example, an electronic equipment product and utilized, it has been experienced that the degree of adherence of interposed resin sheet to the semiconductor element and the heat sink is deteriorated because of the suffering of the semiconductor package from vibration, shock, etc. from outside and because of the long-term irregular heat buildup by the semiconductor element, caused by the use of the electronic equipment product, to thereby render the heat sink unsatisfactory. Therefore, it has been demanded for the resin sheet interposed between the semiconductor element and the heat sink or the like to exhibit high heat conductivity and further to not only simply adhere them to each other but also achieve such a satisfactory bonding that these can resist vibration, etc. from outside.

A method of using a resin sheet in combination with an adhesive or a method wherein a highly adherent liquid epoxy resin or the like is applied to adherend surfaces and cured has been tried for improving the bonding between the semiconductor element and the heat sink or the like. However, the former method has a drawback in that the use of an adhesive causes the heat conductivity to deteriorate. The latter method has a drawback in that accurate coating must be effected on minute semiconductor.elements and, in the use of a two-pack epoxy resin, the addition proportion must be controlled to thereby cause the production process to be complex and lack simplicity.

Furthermore, a method comprising thermally curing, for example, a liquid resin for sheet to a semi-cured state, interposing the semi-cured resin sheet between joining surfaces of the semiconductor element and the heat sink or the like and fully curing the semi-cured resin sheet by heating to thereby bond the semiconductor element and the heat sink or the like to each other has been tried. However, this method has a drawback in that it is difficult to control the curing reaction of, for example, highly adherent epoxy resin so that it is terminated at a semi-cured state, thereby causing readily obtaining such a semi-cured product to be practically infeasible.

Therefore, there has also been a demand for the development of a semi-cured resin sheet which not only exhibits a high heat conductivity but also is excellent in the capability of.bonding a semiconductor element or the like and a heat sink means to each other and further can be readily shaped within a short period of time (subject 2).

On the other hand, apart from the demand of the subject 2, if the heat sink or the like is bonded to the semiconductor element to an inseparable degree, there occurs such a problem that, for example, upon finding of any defect in the semiconductor element, the heat sink or the like cannot be easily detached to thereby cause repairing of the semiconductor element to be difficult.

Therefore, there has further been a demand for the development of a heat-conductive sheet which not only exhibits a high heat conductivity but also adheres a semiconductor element or the like and a heat sink means to each other in a separable condition but with a satisfactory adhesive strength, that is, has a sticky surface (subject 3).

As apparent from the above, it is demanded for the heat-conductive sheet to not only exhibit a high heat conductivity but also have various additional functions such as high bonding capability and adherence permitting detachment. Furthermore, besides these demands, there is a demand for a heat-conductive sheet having excellent insulating capability so as to enable protection against electric shock, depending on the type of heating element, which may be experienced when heat sink is conducted on, for example, a circuit board whose surface is not satisfactorily insulated (subject 4).

Moreover, in the field of electrical equipment and machinery other than semiconductor-related components, for example, with respect to high-voltage rotating machines such as a generator and a motor, the allowable calorific value for high-voltage rotating machines per se tends to increase in conformity with the requirement for an increase of the volume of each unit, a voltage increase therefor, a miniaturization and weight reduction thereof, etc. Thus, as for materials employed therein, especially a heat-conductive sheet interposed between the coil and the iron core of high-voltage rotating machines, a further enhancement of the heat conductivity thereof is now an important task, apart from the above demands for the improvement of heat sink performance with respect to semiconductor-related components. Further, there is also a demand for an enhancement of the heat conductivity of heat sink materials for releasing the heat accumulated in, for example, a magnetic circuit of a speaker unit of an audio equipment. Still further, there is such a problem that a lamp housing and other parts are heated to an extreme degree because of an increase of the output of an UV lamp, etc. to thereby shorten the lamp life and to thereby accelerate the thermal degradation of peripheral materials and elements. Accordingly, it is demanded to further enhance the heat conductivity of heat sink materials therefor (subject 5).

OBJECT OF THE INVENTION

An object of the first invention is to provide a heat-conductive sheet which exhibits a high heat conductivity in the direction of the thickness of the sheet and which is excellent in heat resistance, durability, mechanical strength and adherence to a heating element. Other objects are to provide a process for producing the heat-conductive sheet and a composition suitable for providing the sheet.

An object of the second invention is to provide a semi-cured heat-conductive sheet which exhibits a high heat conductivity in the direction of the thickness of the sheet, which is excellent in not only adherence but also elasticity and durability, and which can be readily molded within a short period of time. Other objects are to provide a process for producing the semi-cured heat-conductive sheet, a sheet joining method and a composition suitable for providing the sheet.

An object of the third invention is to provide a heat-conductive sheet which exhibits a high heat conductivity in the direction of the thickness of the sheet, which is excellent in not only sheet surface stickiness, whilst the sheet can readily be detached in the event of any defect in, for example, the heating element, but also elasticity and durability, and which can be readily shaped within a short period of time. Other objects are to provide a process for producing the heat-conductive sheet, a sheet joining method and a composition suitable for providing the sheet.

An object of the fourth invention is to provide a heat-conductive sheet which exhibits a high heat conductivity in the direction of the thickness of the sheet and which is excellent in heat resistance, durability, mechanical strength and adherence to a heating element, while ensuring insulation from the heating element. Another object is to provide a process for producing the heat-conductive sheet.

An object of the fifth invention is to provide a heat sink structure including the above heat-conductive sheet, which heat sink structure can meet demands for high heat conductivity on, for example, electrical and electronic products.

SUMMARY OF THE INVENTION

The inventors have conducted extensive and intensive studies with a view toward solving the above problems. As a result, it has been found that the heat-conductive sheet wherein a carbon fiber and, furthermore, a magnetic substance are orientated in the cured or semi-cured binder in the direction of the thickness of the heat-conductive sheet realizes a striking enhancement of the anisotropic heat conductivity in the direction of the thickness of the heat-conductive sheet, and that the heat-conductive sheet is excellent in not only heat resistance, durability and mechanical strength but also adherence to a highly heated part. The present invention has been completed on the basis of these findings. With respect to the magnetic substance, it has been found that the magnetic substance is preferably magnetic particles and preferably adheres to the surface of the carbon fiber. (First Invention)

It has also been found that, when use is made of a curing composition for forming a heat-conductive sheet comprising a binder having a photocuring component and a thermocuring component and, contained therein, a magnetic substance and a carbon fiber, a semi-cured sheet containing the highly adherent thermocuring component in uncured form can be obtained by photocuring the photocuring component while applying a magnetic field to the composition so that the magnetic substance and the carbon fiber are orientated in the direction of the thickness of the sheet. Moreover, it has been found that, when the semi-cured heat-conductive sheet containing the uncured thermocuring component is uncured by thermocompression bonding during the process for producing semiconductor packages and the like, the thermocured heat-conductive sheet not only exhibits a high heat conductivity in the direction of the thickness but also has excellent adherence, elasticity and durability. It has also been found that the semi-cured heat-conductive sheet of the present invention can be readily produced within a short molding time. The present invention has been completed on the basis of these findings. (Second Invention)

Further, it has been found that, when use is made of a binder containing a copolymer of specified glass transition temperature and a monomer having an unsaturated bond, the obtained heat-conductive sheet not only exhibits high heat conductivity because, for example, the carbon fiber is orientated in the direction of the thickness of the sheet but also is excellent in sheet surface stickiness although being readily detachable in the event of any defect in the site of use of the heat-conductive sheet. It has also been found that the heat-conductive sheet has excellent durability and can be readily produced within a short molding time. The present invention has been completed on the basis of these findings. (Third Invention)

Still further, the inventors have found that satisfactory insulation without substantial detriment to heat conductivity can be realized by covering the above heat-conductive sheet at part or all of its surface with an electrical insulating layer. It has also been found that the obtained heat-conductive sheet is excellent in not only heat resistance, durability and mechanical strength but also adherence to a heating element. The present invention has been completed on the basis of these findings. (Fourth Invention)

Still further, the inventors have found that the above heat-conductive sheet is useful as a heat sink material in various semiconductor-related equipments, electrical equipments, electronic equipments, power generating equipments and the like. The present invention has been completed on the basis of this finding. (Fifth Invention)

The present invention is, therefore, characterized by the following.

The curing composition for forming a heat-conductive sheet according to the present invention comprises a binder, a magnetic substance and a carbon fiber.

It is preferred that the magnetic substance be a magnetic particle or adhere to the carbon fiber on its surface.

The binder preferably comprises a photocuring component and a thermocuring component. The curing composition for forming a heat-conductive sheet may further comprise a photoinitiator.

The binder may contain (A) a copolymer whose glass transition temperature is −30° C. or below and (B) a monomer having an unsaturated bond.

One form of heat-conductive sheet according to the present invention is a heat-conductive sheet of given thickness comprising a binder and a carbon fiber, wherein the carbon fiber is orientated in the binder in the direction of the thickness of the heat-conductive sheet.

Another form of heat-conductive sheet according to the present invention is a heat-conductive sheet of given thickness comprising a binder, a magnetic substance and a carbon fiber, wherein the magnetic substance and the carbon fiber are orientated in the binder in the direction of the thickness of the heat-conductive sheet.

It is preferred that the magnetic substance be a magnetic particle or adhere to the carbon fiber on its surface.

The binder preferably comprises a thermocuring component and a cured component resulting from curing of a photocuring component.

It is preferred that the binder comprise (A) a copolymer whose glass transition temperature is −30° C. or below and (B) a component resulting from curing of a monomer having an unsaturated bond and that the heat-conductive sheet have a sticky surface.

The heat-conductive sheet of the present invention may comprise the above heat-conductive sheet, as a heat-conductive layer, and an electrical insulating layer laminated on the heat-conductive sheet at part or all of its surface. The electrical insulating layer preferably contains a heat-conductive filler.

One mode of process for producing a heat-conductive sheet according to the present invention comprises the steps of:
    forming a sheeted composition from a curing composition for forming a heat-conductive sheet comprising a binder, a magnetic substance and a carbon fiber; and
    curing or semi-curing the sheeted composition while applying a magnetic field to the sheeted composition in its thickness direction so that the magnetic substance and the carbon fiber are orientated in the direction of the thickness of the sheeted composition. It is preferred that the magnetic substance be a magnetic particle form or adhere to the carbon fiber on its surface.

Another form of process for producing a heat-conductive sheet according to the present invention comprises the steps of:
    forming a sheeted composition from a curing composition for forming a heat-conductive sheet comprising a binder, a magnetic substance and a carbon fiber, the binder containing a photocuring component and a thermocuring component; and
    photocuring the photocuring component of the sheeted curing composition while applying a magnetic field to the sheeted composition in its thickness direction so that the magnetic substance and the carbon fiber are orientated in the direction of the thickness of the sheeted composition, thereby obtaining a semi-cured heat-conductive sheet.

A further mode of process for producing a heat-conductive sheet according to the present invention comprises the steps of:
    forming a sheeted composition from a curing composition for forming a heat-conductive sheet comprising a binder, a magnetic substance and a carbon fiber, the binder containing (A) a copolymer whose glass transition temperature is −30° C. or below and (B) a monomer having an unsaturated bond; and
    curing by light irradiation or heating the monomer having an unsaturated bond (B) of the sheeted composition while applying a magnetic field to the sheeted composition in its thickness direction so that the magnetic substance and the carbon fiber are oriented in the direction of the thickness of the sheeted composition, thereby obtaining a sheet having a sticky surface.

The method of bonding a highly heated part and a heat sink part to each other according to the present invention comprises the steps of:
    interposing between a highly heated part and a heat sink part a semi-cured heat-conductive sheet comprising a binder, a magnetic substance and a carbon fiber, the binder containing a thermocuring component and a cured component resulting from curing of a photocuring component, the magnetic substance and the carbon fiber orientated in the binder in the direction of the thickness of the heat-conductive sheet; and
    curing by thermocompression bonding the thermocuring component of the semi-cured heat-conductive sheet so that the highly heated part and the heat sink part are bonded together by means of the thus obtained heat-conductive sheet.

The method of adhering a highly heated part and a heat sink part to each other according to the present invention comprises the steps of:
    interposing between a highly heated part and a heat sink part a heat-conductive sheet comprising a binder, a magnetic substance and a carbon fiber, (A) the binder containing a copolymer whose glass transition temperature is −30° C. or below and (B) a cured component resulting from curing of a monomer having an unsaturated bond, the magnetic substance and the carbon fiber orientated in the binder in the direction of the thickness of the heat-conductive sheet, the heat-conductive sheet having a sticky surface; and sticking the highly heated part and the heat sink part to each other by means of the heat-conductive sheet.

One form of heat sink structure of the present invention comprises a highly heated part and a heat sink part joined together by means of a heat-conductive sheet of given thickness, the heat-conductive sheet containing a binder and a carbon fiber, the carbon fiber orientated in the binder in the direction of the thickness of the heat-conductive sheet.

Another form of heat sink structure of the present invention comprises a highly heated part and a heat sink part joined together by means of a heat-conductive sheet of given thickness, the heat-conductive sheet containing a binder, a magnetic substance and a carbon fiber, the magnetic substance and the carbon fiber orientated in the binder in the direction of the thickness of the heat-conductive sheet.

A further form of heat sink structure of the present invention comprises a highly heated part and a heat sink part joined together by means of a heat-conductive sheet of given thickness, the heat-conductive sheet comprising:

(a) a heat-conductive layer containing a binder and a carbon fiber, the carbon fiber orientated in the binder in the direction of the thickness of the heat-conductive sheet; and (b) an electrical insulating are laminated on the heat-conductive layer at part or all of its surface.

Still a further form of heat sink structure of the present invention comprises a highly heated part and a heat sink part joined together by means of a heat-conductive sheet of given thickness, the heat-conductive sheet comprising:

(a) a heat-conductive layer containing a binder, a magnetic substance and a carbon fiber, the magnetic substance and the carbon fiber orientated in the binder in the direction of the thickness of the heat-conductive sheet; and (b) an electrical insulating layer laminated on the heat-conductive layer at part or all of its surface.

It is preferred that the highly heated part be a semiconductor element, a semiconductor package, a power transistor, a PTC element, a thyristor, a heating coil of high-voltage rotating machine, a coil of voice coil, a plasma display, an. EL panel, an LD, or an LED.

According to the present invention, there is provided still a further form of heat sink structure comprising a highly heated part having on its surface a heat-conductive sheet of given thickness, the heat-conductive sheet containing a binder and a carbon fiber, the carbon fiber orientated in the binder in the direction of the thickness of the heat-conductive sheet.

According to the present invention, there is provided still a further form of heat sink structure comprising a highly heated part having on its surface a heat-conductive sheet of given thickness, the heat-conductive sheet containing a binder, a magnetic substance and a carbon fiber, the magnetic substance and the carbon fiber orientated in the binder in the direction of the thickness of the heat-conductive sheet.

According to the present invention, there is provided still a further form of heat sink structure comprising a highly heated part having on its surface a heat-conductive sheet of given thickness, the heat-conductive sheet comprising:

(a) a heat-conductive layer containing a binder and a carbon fiber, the carbon fiber orientated in the binder in the direction of the thickness of the heat-conductive sheet; and (b) an electrical insulating layer laminated on the heat-conductive layer at part or all of its surface.

According to the present invention, there is provided still a further form of heat sink structure comprising a highly heated part having on its surface a heat-conductive sheet of given thickness, the heat-conductive sheet comprising:

(a) a heat-conductive layer containing a binder, a magnetic substance and a carbon fiber, the magnetic substance-and the carbon fiber orientated in the binder in the direction of the thickness of the heat-conductive sheet; and (b) an electrical insulating layer laminated on the heat-conductive layer at part or all of its surface.

It is preferred that the highly heated part be a semiconductor element, a semiconductor package, a power transistor, a PTC element, a thyristor, a printed board, a heater of image forming device, a high-temperature fluid, or a light emitter such as an electric lamp.

DETAILED DESCRIPTION OF THE INVENTION

Figure 1:
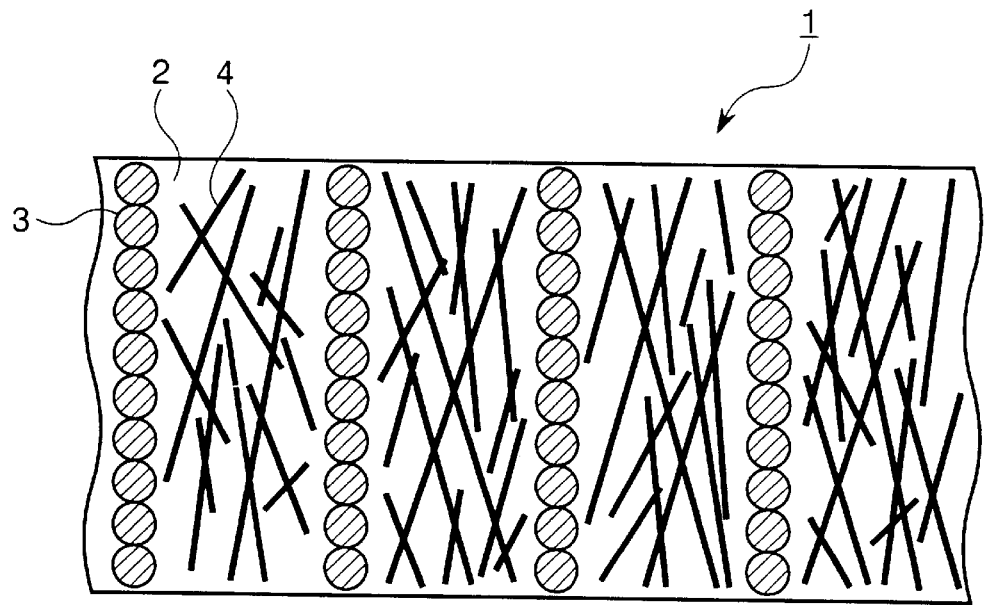
FIG. 1 is a schematic sectional view of a heat-conductive sheet containing a magnetic particle and a carbon fiber.

The curing composition for forming a heat-conductive sheet, heat-conductive sheet, process for producing the same, method of joining a highly heated part and a heat sink part to each other with the use of the heat-conductive sheet and heat sink structure including the heat-conductive sheet, according to the present invention, will be described in greater detail below.

The present invention includes the following.

In the heat-conductive sheet according to the first invention, the carbon fiber, or the carbon fiber and the magnetic substance, are orientated in the binder in the direction of the thickness of the heat-conductive sheet. It is preferred that the magnetic substance be a magnetic particle or adhere to the carbon fiber on its surface.

In the heat-conductive sheet according to the second invention, the magnetic substance and the carbon fiber are orientated in the binder in the direction of the thickness of the heat-conductive sheet. The binder comprises a photocuring component and a thermofuring component.

In the heat-conductive sheet according to the third invention, the magnetic substance and the carbon fiber are orientated in the binder in the direction of the thickness of the heat-conductive sheet. The binder comprises (A) a copolymer whose glass transition temperature is −30° C. or below and (B) a monomer having an unsaturated bond.

In the heat-conductive sheet according to the fourth invention, an electrical insulating layer is laminated on part or all of the surface of the heat-conductive sheet wherein the magnetic substance and the carbon fiber are orientated in the binder in the direction of the thickness of the heat-conductive sheet.

The fifth invention is directed to a heat sink structure comprising any of these heat-conductive sheets.

The terminology "orientated" used herein means that the particles are arranged substantially in a fixed direction and that, for example, rod-shaped carbon fiber is orientated substantially in a fixed direction.

Curing Composition for Forming a Heat-conductive Sheet

The curing composition for forming a forming a heat-conductive sheet according to the present invention comprises a binder, a magnetic substance and a carbon fiber. Optionally, the curing composition for forming a heat-conductive sheet according to the present invention may be loaded with other additives. First, the binder, the carbon fiber, the magnetic substance, other additives and the curing composition for forming a heat-conductive sheet will be sequentially described below.

Binder

<Binder for use in the First and Second Inventions>

In the curing composition for forming a heat-conductive sheet for use in the first invention, the type of binder is not particularly limited. For example, use can be made of both a rubbery polymer and a resinous polymer. According to necessity, the binder may be loaded with a reactive monomer having an unsaturated double bond. The binder which is liquid before curing or semi-curing can preferably be used.

The curing composition for forming a heat-conductive sheet according to the second invention can contain a photo curing component and/or a thermocuring component. The rubbery polymer or resinous polymer as the binder component can also function as the photocuring component and/or thermocuring component. It is preferred that the binder to be contained in the curing composition for forming a heat-conductive sheet be loaded with both the photocuring component and the thermocuring component.

The above rubbery polymer, resinous polymer, photocuring component and thermocuring component will be sequentially described below.

(Rubbery Polymer)

Examples of the rubbery polymers for use in the present invention include conjugated diene rubbers, such as polybutadiene, natural rubber, polyisoprene, SBR and NBR, and hydrogenation products thereof; block copolymers, such as styrene/butadiene block copolymer and styrene/isoprene block copolymer, and hydrogenation products thereof; and chloroprene, urethane rubbers, polyester rubbers, epichlorohydrin rubber, silicone rubber, ethylene/propylene copolymer and ethylene/propylene/diene copolymers. Of these, silicone rubber is especially preferred from the viewpoint of moldability, weather resistance and heat resistance.

Particulars of the silicone rubber will now be set forth. Liquid silicone rubber is preferably used as the above silicone rubber. Use may be made of both condensation-type and addition-type liquid silicone rubbers. Examples thereof include dimethylsilicone raw rubber, methylphenylvinylsilicone raw rubber and derivatives thereof containing functional groups such as vinyl, hydroxyl, hydrosilyl, phenyl and fluoro groups.

(Resinous Polymer)

For example, any of an epoxy resin, a phenolic resin, a melamine resin and an unsaturated polyester resin can be used as the resinous polymer in the present invention. Of these, an epoxy resin is preferably used.

The epoxy resin is preferably one having at least two epoxy groups per molecule, such as phenolic novolak epoxy resin, cresol novolak epoxy resin, bisphenol A epoxy resin, bisphenol F epoxy resin, bisphenol AD epoxy resin, an alicyclic epoxy resin, polyglycidyl (meth)acrylate or a copolymer of glycidyl (meth)acrylate and a comonomer.

The reactive monomer having an unsaturated double bond can be, for example, any of aromatic vinyl compounds such as hydroxystyrene, isopropenylphenol, styrene, α-methylstyrene, p-methylstyrene, chlorostyrene and p-methoxystyrene; and heteroatom-containing alicyclic vinyl compounds such as vinylpyrrolidone and vinylcaprolactam.

(Photocuring Component)

In the present invention, the photocuring component of the binder can contain any of monomers, oligomers, prepolymers and polymers that have radical photopolymerizability, cationic photopolymerizability, coordination photopolymerizability or addition photopolymerizability and thus can be cured by irradiation with ultraviolet light, electron beam or other heat sink. Of these photocuring monomers, oligomers, prepolymers and polymers, those with radical photopolymerizability such as (meth)acrylic compounds and vinyl ether/maleic acid copolymers and those with addition photopolymerizability such as thiol-ene compounds are preferred. Among these, (meth)acrylic compounds are especially preferred. It is most especially preferred that the photocuring component consist of a (meth)acrylic compound monomer which can be photocuring within a short period of time.

Examples of the (meth)acrylic compound monomers from which photopolymerizable monomers, oligomers, prepolymers and polymers can be derived include cyano-containing vinyl compounds such as acrylonitrile and methacrylonitrile, (meth)acrylamide compounds and (meth)acrylic esters.

As the above (meth)acrylamide compounds, there can be mentioned, for example, acrylamide, methacrylamide and N,N-dimethylacrylamide. These can be used either individually or in combination.

As the above (meth)acrylic esters, there can be mentioned, for example, monofunctional (meth)acrylates such as methyl (meth)acrylate, ethyl (meth)acrylate, butyl (meth) acrylate, 2-ethylhexyl (meth)acrylate, hydroxyethyl (meth)acrylate, phenyl (meth)acrylate, benzyl (meth)acrylate, phenoxyethyl (meth)acrylate, cyclohexyl (meth)

acrylate, isobornyl (meth)acrylate and tricyclodecanyl (meth)acrylate. These can be used either individually or in combination.

Also, use can be made of polyfunctional (meth)acrylates, examples of which include bifunctional (meth)acrylates such as ethylene glycol di(meth)acrylate, diethylene glycol di(meth)acrylate, propylene glycol di(meth)acrylate, triethylene glycol di(meth)acrylate, tetraethylene glycol di(meth)acrylate, polyethylene glycol di(meth)acrylate, 1,3-butanediol di(meth)acrylate, 1,4-butanediol di(meth)acrylate, neopentyl glycol di(meth)acrylate, 1,6-hexanediol di(meth)acrylate, 1,9-nonanediol di(meth)acrylate, 1,10-decanediol di(meth)acrylate, glycerol di(meth)acrylate, diacrylates of ethylene oxide or propylene oxide adducts of bisphenol A and bisphneol A/diepoxy/acrylic acid adducts; and trifunctional (meth)acrylates such as trimethylolpropane tri(meth)acrylate, pentaerythritol tri(meth)acrylate and glycerol tri(meth)acrylate.

Of these, di(meth)acrylates such as diethylene glycol di(meth)acrylate, propylene glycol di(meth)acrylate, polyethylene glycol di(meth)acrylate and glycerol di(meth)acrylate are preferably used.

These can be used either individually or in combination.
(Thermocuring Component)

In the present invention, the thermocuring component which can be preferably employed as the binder can be composed of a monomer, oligomer, prepolymer or polymer having a functional group that induces curing upon heating.

Such a functional group can be, for example, an epoxy group, a hydroxyl group, a carboxyl group, an amino group, an isocyanate group, a vinyl group or a hydrosilyl group. An epoxy group, a vinyl group and a hydrosilyl group are preferred from the viewpoint of reactivity.

As the monomer, oligomer, prepolymer or polymer having such a functional group, there can be mentioned, for example, epoxy, urethane and silicone compounds. Of these, epoxy and silicone compounds are preferably used from the viewpoint that the thermocuring time can be shortened. It is preferred that the epoxy and silicone compounds have at least two groups selected from among epoxy, vinyl and hydrosilyl groups per molecule.

The molecular weight of the epoxy compounds, although not particularly limited, generally ranges from 70 to 20,000, preferably from 300 to 5000. For example, various epoxy resins, such as an oligomer, prepolymer or polymer of the above epoxy compounds, having given molecular weight or more are preferably used. As such epoxy compounds, there can be mentioned, for example, the above phenolic novolak epoxy resin, cresol novolak epoxy resin, bisphenol A epoxy resin, bisphenol F epoxy resin, bisphenol AD epoxy resin, alicyclic epoxy resins, polyglycidyl (meth)acrylate and copolymers of glycidyl (meth)acrylate and a comonomer.

When the phenolic novolak epoxy resin or the like is employed as the thermocuring component, it also can function as the resinous polymer component.

The above vinyl-containing silicone rubber can be mentioned as the silicone compound. The use of vinyl-containing silicone compounds is preferred from the viewpoint of the reactivity with hydrosilyl-containing compounds employed as the curing agent. When these silicone compounds are employed as the thermocuring component, they also can function as the rubbery polymer component.

The silicone compounds which also can function as the rubbery polymer component are commercially available. For example, there can be mentioned the two-pack addition-type thermocuring liquid silicone rubber which contains a hydrosilyl compound as the curing agent and can be cured at room temperature.

The above resins can be used either individually or in combination.

(Joint use of Photocuring Component and Thermocuring Component)

The photocuring component and the thermocuring component can be jointly employed in the binder for use in the second invention. In the joint-use system, the thermocuring component is preferably not cured under photocuring conditions. In the present invention, when the photocuring component and the thermocuring component are jointly used as the binder, the mixing ratio (photocuring component/thermocuring component) is preferably in the range of 80/20 to 20/80% by weight, still preferably 70/30 to 30/70% by weight, and optimally 60/40 to 40/60% by weight. When the photocuring component and the thermocuring component are used at the mixing ratio falling within these ranges, not only is the orientation of carbon fiber in the direction of the thickness in the semi-cured heat-conductive sheet satisfactorily accomplished but also, upon curing of the sheet, a highly adherent heat-conductive sheet can be obtained.

In the present invention, for providing the photocuring component and the thermocuring component, the combination of (meth)acrylic compound and epoxy compound is preferred from the viewpoint that the molding time of semi-cured heat-conductive sheet can be shortened and that excellent adherence can be attained.

The method of mixing together the photocuring component and the thermocuring component is not particularly limited. For example, when the acrylic compound monomer is used as the photocuring component and the epoxy resin used as the thermocuring component, the mixing can be accomplished by dissolving the epoxy resin in the acrylic compound monomer.

Compounds containing in each molecule both a photocuring functional group and a thermocuring functional group which does not induce curing under photocuring conditions can be used as a binder component for simultaneously functioning as the photocuring component and the thermocuring component. The above (meth)acrylic compounds can be mentioned as the compound having a photocuring functional group, and, for example, the epoxy group can be mentioned as the thermocuring functional group. Examples of the particular compounds capable of simultaneously functioning as the photocuring component and the thermocuring component include epoxy(meth)acrylamides, such as glycidyl(meth)acrylamide, and epoxy (meth)acrylates, such as glycidyl (meth)acrylate and 3,4-epoxycyclohexyl (meth)acrylate.

When the photocuring component and the thermocuring component are jointly used as the binder, other binder components may be added as long as the addition is not detrimental to the formation of semi-cured heat-conductive sheet by curing of the photocuring component. As such other binder components, there can be mentioned, for example, thermoplastic or thermocuring rubbery polymers and resinous polymers.

Examples of the above rubbery polymers include conjugated diene rubbers, such as polybutadiene, natural rubber, polyisoprene, SBR and NBR, and crosslinked particles therefrom and hydrogenation products thereof; block copolymers, such as styrene/butadiene block copolymer and styrene/isoprene block copolymer, and hydrogenation products thereof; and chloroprene, urethane rubbers, polyester rubbers, epichlorohydrin rubber, silicone rubber, ethylene/propylene copolymer and ethylene/propylene/diene copolymers. For example, any of a phenolic resin, a melamine resin and an unsaturated polyester resin can be used as the resinous polymer.

Furthermore, the binder can be loaded with a reactive monomer having an unsaturated double bond, which can be, for example, any of aromatic vinyl compounds such as hydroxystyrene, isopropenylphenol, styrene, α-methylstyrene, p-methylstyrene, chlorostyrene and p-methoxystyrene; and heteroatom-containing alicyclic vinyl compounds such as vinylpyrrolidone and vinylcaprolactam.

The heat-conductive sheets of the first invention and the second invention can be produced in various forms, for example, (a) nonadherent or only slightly adherent sheet (hereinafter may be referred to as "nonadherent sheet"), (b) sheet exhibiting stickiness (hereinafter may be referred to as "sticky sheet") and (c) anchoring sheet obtained by initially preparing a semi-cured sheet and effecting further curing (related to the second invention and hereinafter may be referred to as "anchoring sheet") by appropriately selecting the type of compounds for use as the binder in conformity with the purpose of the heat-conductive sheet.

For example, when it is intended to obtain the nonadherent sheet (a), the cured sheet obtained by curing the silicone rubber, epoxy resin or the like, selected from among those mentioned above, is preferably employed. When it is intended to obtain the sticky sheet (b), the sheet is preferably formed from the (meth)acrylic compound. Furthermore, when it is intended to obtain the anchoring sheet (c) of the second invention, in the event that the anchoring heat-conductive sheet used after curing a semi-cured sheet is desired, it is preferred that, for example, a thermocuring composition comprising a photocuring component and a thermocuring component as a binder be first semi-cured by irradiation with light and, at the time of use, subjected to further curing and bonding by the thermocompression bonding technique.

<Binder for use in the Third Invention>

The binder for use in the third invention is preferably composed of (A) a copolymer whose glass transition temperature is −30° C. or below and (B) a monomer having an unsaturated bond. This binder may contain a photoinitiator and other additives according to necessity.

Copolymer (A)

The copolymer for use in the binder in the third invention can be produced by copolymerizing a monomer mixture comprising (a) an alkyl ester of (meth)acrylic acid wherein the alkyl has 8 to 12 carbon atoms, (b) (meth)acrylonitrile and (c) an α, β-unsaturated carboxylic acid, optionally together with (d) another monomer copolymerizable therewith.

[Alkyl Ester of (Meth)acrylic Acid wherein the Alkyl has 8 to 12 Carbon Atoms (a)]

The alkyl ester of (meth)acrylic acid wherein the alkyl has 8 to 12 carbon atoms (a) can be, for example, any of 2-ethylhexyl (meth)acrylate, n-octyl (meth)acrylate, isononyl (meth)acrylate and lauryl (meth)acrylate. These alkyl esters of (meth)acrylic acid can be used either individually or in combination. Of these, 2-ethylhexyl acrylate, isononyl acrylate and lauryl acrylate are preferred.

In the third invention, the number of carbon atoms of these alkyl groups is especially important. When the number of carbon atoms of these alkyl groups falls outside the range, it may occur that the obtained heat-conductive sheet cannot have an appropriate stickiness at its surface.

The above alkyl ester of (meth)acrylic acid wherein the alkyl has 8 to 12 carbon atoms (a) is used in an amount of 80 to 99% by weight, preferably 85 to 98% by weight (provided that (a)+(b)+(c)+(d)=100% by weight). When the amount of added alkyl ester of (meth)acrylic acid wherein the alkyl has 8 to 12 carbon atoms (a) is less than 80% by weight or exceeds 99% by weight, the stickiness of the surface of the obtained heat-conductive sheet may become extremely strong to thereby cause peeling of the heat-conductive sheet from the heating element or heat sink as the adherend to be difficult. Further, the strong stickiness may cause contamination of the adherend surface.

(Meth)acrylonitrile (b)

The (meth)acrylonitrile (b) for use in the present invention is preferably acrylonitrile, which is used in an amount of 0.3 to 10% by weight, preferably 1 to 5% by weight (provided that (a)+(b)+(c)+(d)=100% by weight).

α, β-Unsaturated Carboxylic Acid (c)

The α, β-unsaturated carboxylic acid (c) for use in the present invention can be, for example, any of (meth)acrylic acid, itaconic acid, maleic acid and fumaric acid. These α, β-unsaturated carboxylic acids can be used either individually or in combination of them, acrylic acid and methacrylic acid are preferred.

The above α, β-unsaturated carboxylic acid (c) is used in an amount of 0.1 to 5% by weight, preferably 0.3 to 3% by weight (provided that (a)+(b)+(c)+(d)=100% by weight). When the use amount falls outside the range, the stickiness of the surface of the obtained heat-conductive sheet may become extremely strong to thereby cause peeling of the heat-conductive sheet from the heating element or heat sink as the adherend to be difficult. Further, the strong stickiness may cause contamination of the adherend surface.

Monomer (d)

The monomer (d) which is incorporated in the copolymer (A) for use in the present invention according to necessity and which is copolymerizable with the compounds (a), (b) and (c) can be, for example, any of alkyl esters of (meth) acrylic acid wherein the alkyl has not more than 8 carbon atoms, such as methyl (meth)acrylate, ethyl (meth)acrylate, isopropyl (meth)acrylate, butyl (meth)acrylate, pentyl (meth)acrylate, hexyl (meth)acrylate, heptyl (meth)acrylate and octyl (meth)acrylate; hydroxyalkyl esters of (meth) acrylic acid, such as hydroxyethyl (meth)acrylate; alkoxyalkyl esters of (meth)acrylic acid such as methoxyethyl (meth)acrylate and ethoxyethyl (meth)acrylate; glycidyl esters of (meth)acrylic acid, such as glycidyl (meth)acrylate; amides, such as (meth)acrylamide, N-methylolacrylamide, N-methoxymethylacrylamide and N-methoxybutylacrylamide; aminoalkyl esters of (meth) acrylic acid, such as dimethylaminoethyl (meth)acrylate; and aromatic unsaturated hydrocarbons, such as styrene and α-styrene. Of these, methyl methacrylate, butyl acrylate, butyl methacrylate, N-methylolacrylamide and dimethylaminoethyl (meth)acrylate are preferred.

The monomer (d) is preferably used in an amount of 0 to 5% by weight (provided that (a)+(b)+(c)+(d)=100% by weight).

When, in the copolymer (A), the alkyl ester of (meth) acrylic acid wherein the alkyl has 8 to 12 carbon atoms (a), (meth)acrylonitrile (b) and α, β-unsaturated carboxylic acid (c), optionally together with monomer copolymerizable therewith (d), are used in the above proportion, there can be obtained the heat-conductive sheet which is excellent in stickiness and peelability.

Process for Producing Copolymer (A)

The copolymer (A) for use in the present invention can be obtained by performing an emulsion polymerization or solution polymerization of the monomer mixture comprising the alkyl ester of (meth)acrylic acid wherein the alkyl has 8 to 12 carbon atoms (a), (meth)acrylonitrile (b) and α, β-unsaturated carboxylic acid (c), optionally together with monomer copolymerizable therewith (d). The polymerization procedure and conditions are not particularly limited, and the polymerization can be carried out according to the customary procedure under the customary conditions.

With respect to the emulsion polymerization, there can be employed, for example, the process in which the monomer mixture, together with necessary additives such as an emulsifier and a polymerization initiator, is dispersed and emulsified in water to thereby obtain a preemulsion and in which the whole amount of preemulsion is directly subjected to an emulsion polymerization to thereby complete the polymerization; and the process in which an emulsion polymerization is carried out while adding the preemulsion obtained in the same manner continuously or intermittently to thereby complete the polymerization. With respect to the solution polymerization, there can be employed, for example, the process in which the monomer mixture, together with necessary additives such as a polymerization initiator, is dissolved in an appropriate solvent and heated under agitation in an atmosphere of nitrogen gas to thereby complete the polymerization.

The thus obtained copolymer (A) for use in the present invention contains structural units (a1) derived from the alkyl ester of (meth)acrylic acid wherein the alkyl has 8 to 12 carbon atoms in an amount of 80 to 99% by weight, preferably 85 to 98% by weight; structural units (b1) derived from (meth)acrylonitrile in an amount of 0.3 to 10% by weight, preferably 1 to 5% by weight; and structural units (c1) derived from the α, β-unsaturated carboxylic acid in an amount of 0.1 to 5% by weight, preferably 0.3 to 3% by weight; optionally together with structural units (d1) derived from the monomer copolymerizable therewith in an amount of preferably 0 to 5% by weight. (Provided that (a1)+(b1)+(c1)+(d1)=100% by weight.)

The glass transition temperature (Tg) of the copolymer (A) obtained by polymerizing the above monomer mixture is −30° C. or below, preferably −50° C. or below, and still preferably in the range of −90 to −50° C. When the glass transition temperature exceeds −30° C., the stickiness of the surface of the obtained heat-conductive sheet may become extremely strong to thereby cause peeling of the heat-conductive sheet from the heating element or heat sink as the adherend to be difficult. Further, the strong stickiness may cause contamination of the adherend surface.

In the present invention, the glass transition temperature was measured with the use of differential scanning calorimeter (model SSC-500 manufactured by Seiko Instruments Inc.) according to the customary method.

It is preferred that the number average molecular weight, in terms of polystyrene, of copolymer (A) obtained by polymerizing the above monomer mixture, as measured by gel permeation chromatography (GPC), be in the range of 1000 to 50,000, especially 10,000 to 50,000, from the viewpoint that a curing composition for forming a heat-conductive sheet loaded with the copolymer (A) can be easily produced and that the obtained heat-conductive sheet has desirable elasticity and durability.

Monomer Having Unsaturated Bond (B)

Specifically, the monomer having an unsaturated bond (B) for use in the present invention comprises a (meth)acrylic compound. The (meth)acrylic compound can be, for example, any of alkyl esters of (meth)acrylic acid, hydroxyalkyl esters of (meth)acrylic acid, alkoxyalkyl esters of (meth) acrylic acid, glycidyl esters of (meth)acrylic acid, aminoalkyl esters of (meth)acrylic acid, nitriles such as (meth)acrylonitrile, and amides such as acrylamide.

Examples of the alkyl esters of (meth)acrylic acid include methyl (meth)acrylate, ethyl (meth)acrylate, isopropyl (meth)acrylate, butyl (meth)acrylate, pentyl (meth)acrylate, hexyl (meth)acrylate, heptyl (meth)acrylate, octyl (meth) acrylate, 2-ethylhexyl (meth)acrylate, isononyl (meth) acrylate, lauryl (meth)acrylate, phenyl (meth)acrylate, benzyl (meth)acrylate, phenoxyethyl (meth)acrylate, cyclohexyl (meth)acrylate, isobornyl (meth)acrylate and tricyclodecanyl (meth)acrylate.

Examples of the hydroxyalkyl esters of (meth)acrylic acid include hydroxyethyl (meth)acrylate. Examples of the alkoxyalkyl esters of (meth)acrylic acid include methoxyethyl (meth)acrylate and ethoxyethyl (meth)acrylate.

Examples of the glycidyl esters of (meth)acrylic acid include glycidyl (meth)acrylate. Examples of the aminoalkyl esters of (meth)acrylic acid include dimethylaminoethyl (meth)acrylate. Examples of the nitriles include acrylonitrile. Examples of the amides include N-methylolacrylamide, N-methoxymethylacrylamide and N-methoxybutylacrylamide.

These (meth)acrylic compounds can be used either individually or in combination. In the present invention, among these, 2-ethylhexyl acrylate, isononyl acrylate and lauryl methacrylate can preferably be employed.

The monomer having an unsaturated bond (B) for use in the present invention may contain a small amount of polyfunctional (meth)acrylates according to necessity. Examples of such polyfunctional (meth)acrylates include:

bifunctional (meth)acrylates such as ethylene glycol di(meth)acrylate, diethylene glycol di(meth)acrylate, propylene glycol di(meth)acrylate, triethylene glycol di(meth)acrylate, tetraethylene glycol di(meth)acrylate, polyethylene glycol di(meth)acrylate, 1,3-butanediol di(meth)acrylate, 1,4-butanediol di(meth)acrylate, neopentyl glycol di(meth)acrylate, 1,6-hexanediol di(meth)acrylate, 1,9-nonanediol di(meth)acrylate, 1,10-decanediol di(meth)acrylate, glycerol di(meth) acrylate, diacrylates of ethylene oxide or propylene oxide adducts of bisphenol A and bisphneol A/diepoxy/acrylic acid adducts; and trifunctional (meth)acrylates such as trimethylolpropane tri(meth)acrylate, pentaerythritol tri(meth)acrylate and glycerol tri(meth)acrylate.

Of these, di(meth)acrylates selected from among diethylene glycol di(meth)acrylate, propylene glycol di(meth) acrylate, polyethylene glycol di(meth)acrylate and glycerol di(meth)acrylate are preferably used.

These can be used either individually or in combination.

Binder for use in the Third Invention

The binder for use in the third invention may contain the copolymer (A) and the monomer having an unsaturated bond (B).

The mixing ratio of copolymer (A) and monomer having an unsaturated bond (B) (copolymer/monomer having an unsaturated bond) is preferably in the range of 80/20 to 20/80% by weight, still preferably 70/30 to 30/70% by weight, and optimally 60/40 to 40/60% by weight. When the copolymer and the monomer having an unsaturated bond are used at the mixing ratio falling within these ranges, not only is the orientation of magnetic substance and carbon fiber in the direction of the thickness in the heat-conductive sheet satisfactorily accomplished but also a sheet as a product of curing of adherent heat-conductive sheet having a highly sticky surface can be obtained.

The method of mixing together the copolymer and the monomer having an unsaturated bond is not particularly limited. For example, when the acrylic compound monomer is used as the monomer having an unsaturated bond, the mixing can be accomplished by dissolving the copolymer in the acrylic compound monomer.

In the third invention, in addition to the copolymer (A) and the monomer having an unsaturated bond (B), the binder may contain other binder components as long as the addition is not detrimental to the formation of cured heat-conductive sheet by curing thereof. As such other binder components, there can be mentioned, for example, thermoplastic or thermocuring rubbery polymers and resinous polymers.

Examples of the above rubbery polymers include conjugated diene rubbers, such as polybutadiene, natural rubber, polyisoprene, SBR and NBR, and crosslinked particles therefrom and hydrogenation products thereof; block copolymers, such as styrene/butadiene block copolymer and styrene/isoprene block copolymer, and hydrogenation products thereof; and chloroprene, urethane rubbers, polyester rubbers, epichlorohydrin rubber, silicone rubber, ethylene/propylene copolymer and ethylene/propylene/diene copolymers. For example, any of a phenolic resin, a melamine resin and an unsaturated polyester resin can be used as the resinous polymer.

Furthermore, the binder can be loaded with an aromatic vinyl compound, a heteroatom-containing alicyclic vinyl compound and the like according to necessity. The aromatic vinyl compound can be, for example, any of hydroxystyrene, isopropenylphenol, styrene, α-methylstyrene, p-methylstyrene, chlorostyrene and p-methoxystyrene. The above heteroatom-containing alicyclic vinyl compound can be, for example, vinylpyrrolidone or vinylcaprolactam.

<Carbon Fiber>

The heat conductivity ($W\ m^{-1}K^{-1}$) along fiber length of the carbon fiber for use in the present invention is preferably at least 100, still preferably at least 500, and optimally at least 1200.

The carbon fiber can be selected from among carbon fibers classified according to the type of raw material, such as carbonized-cellulose carbon fiber, carbonized-PAN carbon fiber and carbonized-pitch carbon fiber. From the viewpoint of high heat conductivity, carbonized-pitch carbon fiber is preferably employed in the present invention. With respect to the carbonized-pitch carbon fiber, both an anisotropic carbon fiber and an isotropic carbon fiber can be used as long as high heat conductivity is exhibited.

The carbon fiber for use in the present invention can be prepared by the conventional process. Alternatively, use can be made of commercially available carbon fibers.

The diameter of the carbon fiber is preferably in the range of 5 to 500 $\mu$m, still preferably 10 to 200 $\mu$m.

The aspect ratio of the carbon fiber is preferably at least 1.5, still preferably 2 to 100, yet still preferably 5 to 100, and optimally 10 to 50.

The carbon fiber is preferably used in an amount of 2 to 70% by volume, still preferably 10 to 70% by volume, yet still preferably 10 to 60% by volume, and optimally 15 to 50% by volume, based on the curing composition for forming a heat-conductive sheet.

When the amount is less than 2% by volume, it may occur that the heat conductivity of cured heat-conductive sheet is not satisfactorily high. On the other hand, when the amount exceeds 70% by volume, the obtained heat-conductive sheet is likely to become brittle and the elasticity to be had by the heat-conductive sheet may not be obtained.

<Magnetic Substance>

In the present invention, the curing composition for forming a heat-conductive sheet contains a magnetic substance. It is preferred that the magnetic substance be a magnetic particle or adhere to the carbon fiber on its surface.

The material suitable for use as the magnetic substance in the present invention can be, for example, a ferromagnetic metal such as iron, cobalt or nickel, or an alloy of the ferromagnetic metal. Further, the material can be an intermetallic compound containing the ferromagnetic metal such as iron, cobalt or nickel, or a metal compound such as an oxide of the ferromagnetic metal.

(Magnetic Particle)

Magnetic substance particles employed as a preferred form of magnetic substance are not particularly limited as long as they exhibit such a magnetism that an orientation is effected in the direction of magnetic field when a magnetic field is applied by the method described later.

The magnetic particles are metal particles obtained by forming the above magnetic substance into particles. The magnetic substance particles can be particles obtained by plating the surface of core particles of a metal such as iron, nickel or cobalt with another metal, e.g., a metal of high heat conductivity, or particles obtained by at least plating the surface of core particles composed of nonmagnetic metal particles, inorganic particles such as glass beads or polymer particles with a ferromagnetic metal such as iron, nickel or cobalt. The method of covering the surface of core particles with a metal, although not particularly limited, can be, for example, chemical plating or electroless plating. The amount of magnetic substance covering the surface of core particles is preferably in the range of 0.5 to 50% by weight, still preferably 1 to 30% by weight, yet still preferably 2 to 25% by weight, and optimally 4 to 20% by weight, based on the core particles.

With respect to these magnetic particles, the particle diameter is preferably in the range of 1 to 1000 $\mu$m, still preferably 2 to 500 $\mu$m, yet still preferably 5 to 300 $\mu$m, and optimally 10 to 200 $\mu$m.

The shape of the magnetic particles is not particularly limited, which can be, for example, a sphere, a star, a bulk being secondary particle resulting from aggregation thereof, or a slender rod.

The water content of the magnetic substance particles is preferably 5% or less, still preferably 3% or less, yet still preferably 2% or less, and optimally 1% or less. The use of the magnetic particles satisfying this requirement enables preventing or restricting the void formation in the heat-conductive sheet at the time of obtaining the semi-cured heat-conductive sheet by semi-curing the curing composition for forming a heat-conductive sheet in the process described later.

The magnetic particles are preferably used in an amount of 10 to 50% by volume, still preferably 15 to 40% by volume, based on the curing composition for forming a heat-conductive sheet.

When the amount is less than 10% by volume, it may occur that orientating the carbon fiber together with the magnetic particles in the direction of magnetic field in the semi-cured heat-conductive sheet is difficult. On the other hand, when the amount exceeds 50% by volume, the obtained semi-cured heat-conductive sheet and heat-conductive sheet resulting from curing thereof are likely to become brittle and the elasticity to be had by the heat-conductive sheet may not be obtained.

The magnetic particles and the carbon fiber are preferably contained in a total amount of 20 to 80% by volume, still preferably 30 to 60% by volume, based on the total volume of curing composition for forming a heat-conductive sheet.

Magnetic particles having their surface treated with a coupling agent such as a silane coupling agent can appropriately be used. When the surface of magnetic particles is treated with a coupling agent, the adherence of magnetic particles to the binder is increased with the result that the obtained heat-conductive sheet has enhanced durability.

(Magnetic Substance Adhering to the Surface of Carbon Fiber)

The terminology "magnetic substance adhering to the surface of carbon fiber" used herein means the carbon fiber adhered with the above magnetic substance to the surface of the above carbon fiber.

The magnetic substance adhering to the surface of carbon fiber, for use in the present invention, may be in the state of adhering in layers to the entire surface of the carbon fiber, or adhering without forming layers to part of the surface of the carbon fiber, as long as such a magnetism that an orientation in the direction of, magnetic field can be effected upon application of a magnetic field by the method described later is exhibited. The constituent material and thickness of the magnetic substance are not particularly limited.

The method of adhering the magnetic substance to the surface of carbon fiber can be performed by, for example, chemical plating or other electroless plating.

The total amount of the "carbon fiber to whose surface the magnetic substance is adhering" contained in the total volume of curing composition for forming a heat-conductive sheet is preferably in the range of 2 to 70% by volume, still preferably 10 to 60% by volume, based on the total volume of curing composition for forming a heat-conductive sheet.

When the amount is less than 2% by volume, it may occur that the heat conductivity of cured heat-conductive sheet is not satisfactorily high. On the other hand, when the amount exceeds 70% by volume, the obtained heat-conductive sheet is likely to become brittle and the elasticity to be had by the heat-conductive sheet may not be obtained.

The carbon fiber to whose surface the magnetic substance is adhering, having its surface further treated with a coupling agent such as a silane coupling agent, can appropriately be used. When the surface of the carbon fiber to whose surface the magnetic substance is adhering is further treated with a coupling agent, the adherence of the carbon fiber to whose surface the magnetic substance is adhering to the binder is increased with the result that the obtained heat-conductive sheet has enhanced durability.

(Photoinitiator)

In the first to third inventions, the curing composition for forming a heat-conductive sheet according to the present invention can be loaded with, for example, a photoinitiator, depending on the type of heat sink employed in the photocuring of the photocuring component, etc., for example, in ultraviolet curing.

The photoinitiator is not limited as long as it can cure the photocuring component of the curing composition for forming a heat-conductive sheet under photocuring conditions employed in the present invention. In the event of jointly using the photocuring component and the thermocuring component, the photoinitiator is not limited as long as it can cure the photocuring component while not curing the thermocuring component. Use can be made of conventional photoinitiators.

Examples of these photoinitiators include α-diketones such as benzil and diacetyl; acyloins such as benzoin; acyloin ethers such as benzoin methyl ether, benzoin ethyl ether and benzoin isopropyl ether; benzophenones such as thioxanthone, 2,4-diethylthioxanthone, thioxanthone-4-sulfonic acid, benzophenone, 4,4(-bis(dimethylamino)) benzophenone and 4,4'-bis(diethylamino)benzophenone; acetophenones such as acetophenone, p-dimethylaminoacetophenone, α,α'-dimethoxyacetoxybenzophenone, 2,2'-dimethoxy-2-phenylacetophenone, p-methoxyacetophenone, 2-methyl[4 (methylthio)phenyl]-2-morpholino-1-propanone and 2-benzyl-2-dimethylamino-1-(4-morpholinophenyl)-butan-1-one; quinones such as anthraquinone and 1,4-naphthoquinone; halogen compounds such as phenacyl chloride, tribromomethylphenyl sulfone and tris (trichloromethyl)-s-triazine; peroxides such as di-t-butyl peroxide; and acylphosphine oxides such as 2,4,6-trimethylbenzoyldiphenylphosphine oxide. Also, use can be made of commercially available photoinitiators, examples of which include Irgacure 184, 651, 500, 907, CG1369 and CG24-61 and Darocur 1116 and 1173 (produced by Ciba Specialty Chemicals), Lucirin LR8728 and TPO (produced by BASF) and Ubecuryl P36 (produced by UCB).

In the event of jointly using the photocuring component and the thermocuring component in the binder, for example, photoinitiators Irgacure 651 and Lucirin TPO ensuring rapid curing can preferably be used when the photocuring component and thermocuring component contained in the curing composition for forming a heat-conductive sheet are a (meth)acrylic compound and an epoxy compound, respectively.

Although an appropriate amount of photoinitiator is to be used taking into account, for example, a balance of practical curing rate and pot life, in particular, it is preferred that the photoinitiator be contained in the binder in an amount of 1 to 50 parts by weight, especially 5 to 30 parts by weight, per 100 parts by weight of the photocuring component. When the amount is less than 1 part by weight, the composition is likely to suffer from sensitivity deterioration by oxygen. On the other hand, when the amount exceeds 50 parts by weight, problems of poor compatibility and poor storage stability may be encountered.

A photoinitiation auxiliary can be used in combination with the above photoinitiator. The joint use of the photoinitiation auxiliary accelerates an initiation reaction and enables efficiently conducting a curing reaction, as compared with the use of the photoinitiator alone. Common photoinitiation auxiliaries can be employed. The photoinitiation auxiliary can be, for example, any of aliphatic amines such as triethanolamine, methyldiethanolamine, triisopanolamine, n-butylamine, N-methyldiethanolamine and diethylaminoethyl (meth)acrylate; and Michler's ketone, 4,4'-diethylaminophenone, ethyl 4-dimethylaminobenzoate, methyl 4-dimethylaminobenzoate and isoamyl 4-dimethylaminobenzoate.

(Thermocuring Agent)

In the present invention, a thermocuring agent may be mixed into the curing composition for forming a heat-conductive sheet in order to accelerate the thermocuring of the thermocuring component. Conventional thermocuring agents can be employed. The thermocuring agent can be, for example, any of amines, dicyandiamide, dibasic acid dihydrazides, imidazoles, hydrosilyl compounds: and vinylsilyl compounds.

Specifically, the thermocuring agent can be, for example, any of polymethylenediamine, diethylenetriamine, dimethylaminopropylamine, bishexamethylenetriamine, diethylaminopropylamine, polyetherdiamine, 1,3-diaminocyclohexane, diaminodiphenylmethane, diaminodiphenyl sulfone, 4,4'-bis(o-toluidine), m-phenylenediamine, 2-phenyl-4-methyl-5-hydroxymethylimidazole, blocked imidzle, polydimethylsiloxane having hydrosilyl groups at both terminals thereof and polydimethylsiloxane having vinyl groups at both terminals thereof.

Although an appropriate amount of thermocuring agent is to be used taking into account, for example, a balance of practical curing rate and pot life, in particular, it is preferred that the thermocuring agent be contained in the binder in an amount of 1 to 50 parts by weight, especially 1 to 30 parts by weight, per 100 parts by weight of the thermocuring component.

Although the method of adding the photoinitiator and the thermocuring agent is not particularly limited, it is preferred that these be mixed in the binder in advance from the viewpoint of storage stability and inhibition of a catalyst localization at the component mixing.

<Other Additive>

In the present invention, the curing composition for forming a heat-conductive sheet can be loaded with an inorganic filler such as ordinary silica powder, colloidal silica, aerogel silica or alumina according to necessity. The loading with such an inorganic filler ensures thixotropy during the period of noncuring, realizes a viscosity increase, enhances the dispersion stability of the carbon fiber to whose surface the magnetic substance is adhering in the composition, and enables increasing the strength of the cured or semi-cured heat-conductive sheet.

Although the loading amount of inorganic filler is not particularly limited, any excess use thereof is unfavorable because the orientation by magnetic field of the magnetic particles and the carbon fiber, or carbon fiber to whose surface the magnetic substance is adhering, cannot satisfactorily be accomplished.

The curing composition for forming a heat-conductive sheet of the present invention may be loaded with a curing catalyst for curing the binder according to necessity. For example, an organic peroxide, an aliphatic azo compound or a hydroxylating catalyst can be used as such a curing catalyst. The organic peroxide can be, for example, any of benzoyl peroxide, bisdicyclobenzoyl peroxide, dicumyl peroxide and di-tert-butyl peroxide. The aliphatic azo compound can be, for example, azobisisobutyronitrile. As a catalyst for hydrosilylating reaction, there can be employed conventional catalysts, such as chloroplatinic acid or its salt, a platinum/unsaturated-group-containing siloxane complex, a vinylsiloxane/platinum complex, a platinum/1,3-divinyltetramethyldisiloxane complex, a triorganophosphine or phosphite/platinum complex, an acetylactonatoplatinum chelate and a cyclic diene/platinum complex.

The curing of the heat-conductive sheet can be performed by exposing the same to heat sink.

Although the method of adding the curing catalyst is not particularly limited, it is preferred that the curing catalyst be mixed in the binder in advance from the viewpoint of storage stability and inhibition of a catalyst localization at the component mixing. With respect to the addition amount of curing catalyst, an appropriate amount is preferably used taking into account, for example, a balance of practical curing rate and pot life. Moreover, a hydrosilylating reaction controlling agent, such as an amino-group-containing siloxane or hydroxyl-group-containing siloxane, usually employed for controlling the curing rate and the pot life can be used in combination with the thermocuring catalyst.

Further, the curing composition for forming a heat-conductive sheet according to the present invention may be loaded with a silane coupling agent or a titanium coupling agent.

Still further, in the present invention, the curing composition for forming a heat-conductive sheet can be loaded with other additives according to necessity. Examples of such other additives include an ultraviolet absorber, a thermal polymerization stabilizer, an antioxidant, a thermal stabilizer, an antistatic agent, a flame retardant, an adherence improver and a mildewproofing agent.

<Preparation of Curing Composition for Forming a Heat-conductive Sheet>

In the present invention, any customary technique can be employed for the preparation of the curing composition for forming a heat-conductive sheet. For example, use can be made of the method in which the binder comprising the photccuring component and the thermocuring component, the magnetic substance and the carbon fiber, optionally together with the photoinitiator, the thermocuring agent and the inorganic filler, are mixed and milled together.

The curing composition for forming a heat-conductive sheet according to the present invention is preferably in the form of a paste. The viscosity of the curing composition for forming a heat-conductive sheet is preferably in the range of 10,000 to 1,000,000 cp at 25° C.

The heat-conductive sheet can be produced by sheeting the above curing composition for forming a heat-conductive sheet, applying a magnetic field to the sheeted composition in the direction of the thickness thereof so that the magnetic substance and the carbon fiber are orientated and curing the binder.

[Heat-conductive Sheet]

The method of orientating the carbon fiber in the direction of the thickness of the heat-conductive sheet in the heat-conductive sheet according to the first to third inventions is not particularly limited as long as the carbon fiber can be substantially orientated in the direction of the thickness of the heat-conductive sheet. For example, the heat-conductive sheet of the present invention can be formed by sheeting the above curing composition for forming a heat-conductive sheet wherein the magnetic substance and the carbon fiber are contained in the binder and, while applying a magnetic field to the heat-conductive sheet composition in the direction of the thickness thereof to thereby orientate the magnetic substance and the carbon fiber, curing or semi-curing the heat-conductive sheet composition by light irradiation or heating.

Figure 2:
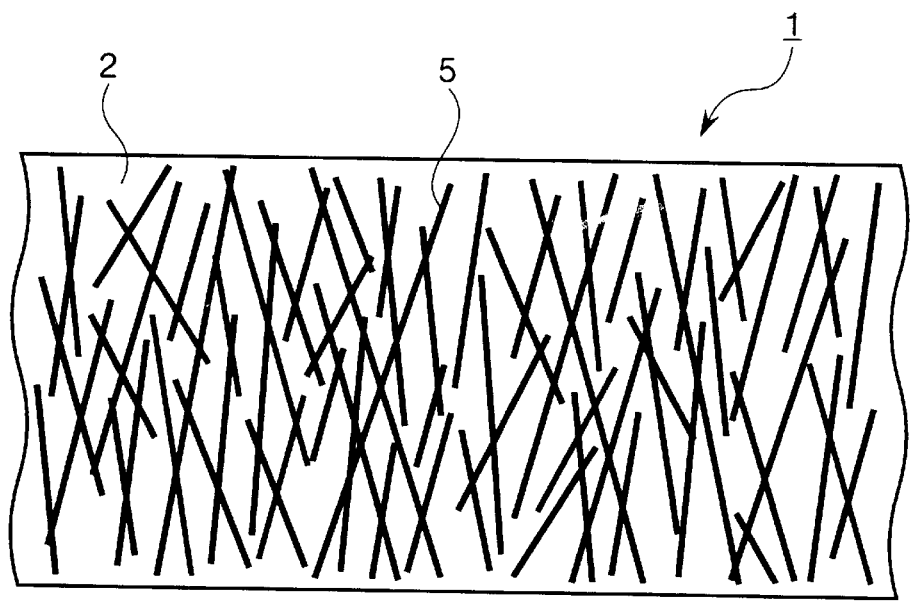
FIG. 2 is a schematic sectional view of a heat-conductive sheet containing a carbon fiber onto whose surface a magnetic substance adheres.

A particular example of the above heat-conductive sheet will now be described with reference to FIGS. 1 and 2. For example, as shown in FIG. 1, in the heat-conductive sheet 1 according to the present invention, the magnetic particles 3 and the carbon fiber 4 are orientated in the cured binder 2 in the direction of the thickness of the heat-conductive sheet. Referring to FIG. 2, in the heat-conductive sheet 1, the carbon fiber 5 to whose surface the magnetic substance is adhering is orientated in the cured binder 2 in the direction of the thickness of the heat-conductive sheet. FIGS. 1 and 2 are schematic views of the heat-conductive sheet of the present invention.

In the present invention, the thickness of the heat-conductive sheet, although varied depending on the use thereof, etc. and not particularly limited, is generally in the range of about 50 to 1000 μm.

(Formation of Sheeted Composition)

Customary techniques can be employed in sheeting the curing composition for forming a heat-conductive sheet as aforementioned. For example, rolling, casting or coating can be employed. The thickness of the sheeted composition, although varied depending on the use of the heat-conductive sheet, etc. and not particularly limited, is generally in the range of about 50 to 1000 μm.

In the present invention, in the formation of the heat-conductive sheet, the sheet can be cured while the magnetic substance and the carbon fiber are orientated in the direction of the thickness of the sheet by applying a magnetic field in the direction of the thickness of the sheet while sheeting the curing composition for forming a heat-conductive sheet by rolling. In the event of carrying out the alignment of magnetic substance and carbon fiber and the composition curing while rolling the curing composition for forming a heat-conductive sheet, it is preferred that the sheet thickness ($D_1$) at the initiation of orientating of the magnetic substance and the carbon fiber in the magnetic field direction, effected by application of a magnetic field, be at least 1.3 times, especially 2 to 4 times, and still especially 2 to 3 times, the sheet thickness ($D_2$) at the termination of orientation.

(Method of Orientating Carbon Fiber)

The strength of magnetic field applied for orientating the magnetic substance and carbon fiber contained in the curing composition for forming a heat-conductive sheet in the direction of the thickness of the curing composition for forming a heat-conductive sheet is preferably in the range of about 500 to 50,000 gauss, still preferably about 2000 to 20,000 gauss. The period of magnetic field application is preferably in the range of about 1 to 120 min, still preferably about 5 to 30 min. The magnetic field application may be performed at room temperature, or while curing by heating according to: necessity.

The amounts of binder, magnetic substance and carbon fiber in the heat-conductive sheet are the same as mentioned above with respect to the curing composition for forming a heat-conductive sheet.

(Method of Curing a Curing Composition for Forming a Heat-conductive Sheet According to First Invention)

In the first invention, the method of curing the heat-conductive sheet is varied depending on the type of employed binder and the required sheet performance and not limited. For example, the curing may be performed at room temperature or while heating. For example, the curing composition for forming a heat-conductive sheet can be cured by heating the composition wherein the epoxy resin is used as a binder component at preferably 80 to 180° C., still preferably 100 to 160° C. The heating method is not particularly limited, and can be common one. The curing of the curing composition for forming a heat-conductive sheet can be effected by the use of conventional heater or the like. The heating time is not particularly limited. Preferably, it is in the range of about 5 to 120 min.

This curing method for the heat-conductive sheet can preferably be employed in the production of, for example, the above nonadherent sheet (a).

Further, for example, when the (meth)acrylic compound is used as a binder component, the curing can preferably be effected by heating the composition at 60 to 120° C., still preferably 80 to 100° C., for 5 to 120 min, still preferably 10 to 60 min. When the binder contains the (meth)acrylic resin as a binder component, the heat-conductive sheet can be obtained by performing selective irradiation with, for example, visible light, ultraviolet heat sink, infrared heat sink, far infrared heat sink, electron beams or X rays in the presence of a photoinitiator. The irradiation method is not particularly limited, and conventional techniques can be employed. For example, the curing composition for forming a heat-conductive sheet can be placed in common photopolymerization apparatus and irradiated with ultraviolet of specified wavelength or the like. In the use of an ultraviolet fluorescent lamp, it is generally preferred that the irradiation time and irradiation distance be in the range of about 2 to 3 min and about 5 to 10 cm, respectively. In the use of a high-pressure mercury lamp, it is generally preferred that the irradiation time and irradiation distance be in the range of about 10 to 20 sec and about 7 to 20 cm, respectively.

In the orientating of the carbon fiber loaded with the magnetic substance, the orientating of the magnetic substance and carbon fiber may be performed simultaneously with the curing or semi-curing of the heat-conductive sheet composition. Alternatively, the orientating may be performed prior to the curing or semi-curing. From the viewpoint of effecting complete orientation of the carbon fiber, it is preferred that the orientating of carbon fiber by magnetic field application be performed prior to the curing or semi-curing of the binder.

This curing method for heat-conductive sheet can be employed in the production of, for example, the above sticky sheet (b).

The above heat-conductive sheet of the present invention is excellent in the anisotropic heat conductivity in the direction of the thickness thereof because the magnetic substance and the carbon fiber are orientated in the direction of the thickness of the heat-conductive sheet. Thus, a heat sink structure of high heat sink efficiency can be obtained therefrom.

(Method of Curing a Curing Composition for Forming a Heat-conductive Sheet According to Second Invention)

With respect to the curing method employed in the event of using the photocuring component and the thermocuring component in the binder for constituting the heat-conductive sheet (second invention (anchoring sheet)), the sewing manner. That is, the semi-cured heat-conductive sheet can be obtained by producing the heat-conductive sheet composition with the use of a (meth)acrylic compound as the photocuring component and an epoxy compound as:the thermocuring component and selectively irradiating the composition with, for example, visible light, ultraviolet heat sink, infrared heat sink, far ultraviolet heat sink, electron beams or X rays to thereby cure the photocuring component of the heat-conductive sheet composition.

The irradiation method is not particularly limited, and conventional techniques can be employed. For example, the curing composition for forming a heat-conductive sheet can be placed in common photopolymerization apparatus and irradiated with ultraviolet of specified wavelength or the like. The light source for the irradiation is not particularly limited. In the use of an ultraviolet fluorescent lamp, it is generally preferred that the irradiation time and irradiation distance be in the range of about 2 to 3 min and about 5 to 10 cm, respectively. In the use of a high-pressure mercury lamp, it is generally preferred that the irradiation time and irradiation distance be in the range of about 10 to 20 sec and about 7 to 20 cm, respectively.

In the joint use of the photocuring component and thermocuring component in the binder of the heat-conductive sheet, the procedure for irradiating the curing composition for forming a heat-conductive sheet while applying a magnetic field to the composition so that the magnetic substance and the carbon fiber are orientated in the direction of the thickness of the heat-conductive sheet to thereby obtain the semi-cured heat-conductive sheet is not particularly limited. Magnetic field application can be performed simultaneously with the irradiation. Alternatively, the magnetic field application for orientating the magnetic substance and the carbon fiber in the direction of the thickness of the sheet may be performed prior to the irradiation for semi-curing the sheet composition. From the viewpoint of effecting complete orientation of the magnetic substance and carbon fiber, it is preferred that the magnetic field application for orientating them be performed prior to the irradiation for semi-curing the sheet composition. Although the temperature for obtaining the semi-cured heat-conductive sheet is not particularly limited as long as the thermocuring component of the sheet composition is not cured, it is generally preferred that the temperature be about room temperature, especially 20 to 100° C., and still especially 20 to 60° C.

This photocuring enables forming the semi-cured heat-conductive sheet easily within a short period of time.

(Method of Curing a Curing Composition for Forming a Heat-conductive Sheet According to Third Invention)

In the formation of the heat-conductive sheet according to the third invention, the sheet composition is heated or selectively irradiated with, for example, visible light, ultraviolet heat sink or infrared heat sink so as to supply energy required for curing with the result that the monomer having an unsaturated bond contained in the sheet composition is polymerized and cured to thereby enable obtaining the heat-conductive sheet. For obtaining the heat-conductive sheet in this invention, the method of curing the monomer having an unsaturated bond by irradiation is preferred from the viewpoint that the heat-conductive sheet can be formed easily within a short period of time.

The irradiation method is not particularly limited, and conventional techniques can be employed. For example, the same procedure and conditions as in the irradiation method of the above first and second inventions can be employed. Specifically, the heat-conductive sheet can be placed in common photopolymerization apparatus and irradiated with ultraviolet of specified wavelength or the like. The light source for the irradiation is not particularly limited. When an ultraviolet irradiation is employed, for example, an ultraviolet fluorescent lamp or a high-pressure mercury lamp can preferably be used as an ultraviolet emitting source. In the use of an ultraviolet fluorescent lamp, it is generally preferred that the irradiation time and irradiation distance be in the range of about 2 to 3 min and about 5 to 10 cm, respectively. In the use of a high-pressure mercury lamp, it is generally preferred that the irradiation time and irradiation distance be in the range of about 10 to 20 sec and about 7 to 20 cm, respectively.

In the third invention, the procedure for photopolymerizing the noncured sheet composition while applying a magnetic field to the composition so that the magnetic substance and the carbon fiber are orientated in the direction of the thickness of the sheet to thereby obtain the heat-conductive sheet is not particularly limited. Magnetic field application can be performed simultaneously with the irradiation. Alternatively, the magnetic field application for orientating the magnetic substance and the carbon fiber in the direction of the thickness of the sheet may be performed prior to the irradiation for curing the sheet composition. From the viewpoint of effecting complete orientation of the magnetic substance and carbon fiber, it is preferred that the magnetic field application for orientating them be performed prior to the irradiation for curing the sheet composition.

The heat-conductive sheet of this invention can be formed easily within a short period of time.

(Method of Bonding Heat-conductive Sheet of Second Invention)

The formation of, for example, the anchoring sheet (c) by the joining of a heat sink part and a highly heated part such as a semiconductor package to each other by means of the heat-conductive sheet obtained by curing the semi-cured heat-conductive sheet can be accomplished by cutting the semi-cured heat-conductive sheet into a given shape, interposing the shaped heat-conductive sheet between two members, for example, a highly heated part and a heat sink part, and thermally curing, by the thermocompression bonding, the thermocuring component of the semi-cured heat-conductive sheet. Although the conditions for the thermocompression bonding are varied depending on the type of employed members and not limited, with respect to, for example, a heat sink structure for semiconductor package, the thermocompression bonding is preferably carried out under such conditions that the highly heated part and heat sink part as constituents of the heat sink structure and the wiring, bump and other parts disposed in the heat sink structure are not deformed, damaged or melted by the temperature and pressure exerted by the thermocompression bonding. According to necessity, appropriate selection can be made from among the method in which members are compressed at room temperature or in the state of being heated to such a degree that curing reaction cannot satisfactorily proceed, temporarily bonded to each other and thereafter heated to complete the curing reaction, the method in which members are fully heated at compression to thereby simultaneously carry out bonding and curing, etc. For example, the thermocompression bonding temperature is preferably set at 80 to 180° C., still preferably 100 to 160° C., and optimally 120 to 150° C. When the temperature is lower than 80° C., the thermal curing may not be satisfactorily accomplished with a prolonged reaction time required. On the other hand, when the temperature exceeds 180° C., for example, the solder applied to the highly heated part may be melted. The thermocompression bonding pressure is preferably set at 0.1 to 5 kg/cm$^2$, still preferably 0.5 to 2 kg/cm$^2$. When the pressure is lower than 0.1 kg/cm$^2$, the bonding between the highly heated part and the heat sink part may be unsatisfactory. On the other hand, when the pressure exceeds 5 kg/cm$^2$, the highly heated part such as a semiconductor element may be damaged. Generally, the thermocompression bonding time is preferably in the range of about 1 to 120 min, still preferably about 20 to 60 min.

In the second invention, the thermocompression bonding of the highly heated part and the heat sink part to each other by means of the semi-cured heat-conductive sheet interposed therebetween enables realizing satisfactory bonding of the highly heated part and the heat sink part, so that peeling of the highly heated part and heat sink part from the heat-conductive sheet because of the expansion or shrinkage of such members caused by heat buildup from the highly heated part or because of, for example, any vibration or shock from outside can be prevented. Thus, enhancement of reliability as to heat release and semiconductor package functions can be attained. The thermocompression bonding of the highly heated part and heat sink part with the use of the semi-cured heat-conductive sheet can be performed by cutting the semi-cured heat-conductive sheet into a given shape and interposing the shaped heat-conductive sheet between the highly heated part and the heat sink part, which is extremely easy as compared with the formation of the heat-conductive sheet by coating or the like. Further, the heat-conductive sheet obtained by curing the semi-cured heat-conductive sheet has such an excellent elasticity that it can resist the expansion and shrinkage of members disposed in the heat sink structure. Still further, the heat-conductive sheet obtained by curing the semi-cured heat-conductive sheet is excellent in the anisotropic heat conductivity in the direction of the thickness of the heat-conductive sheet because the magnetic substance and the carbon fiber are orientated in the direction of the thickness. Accordingly, the heat sink structure of high heat sink efficiency can be :obtained with the use of the heat-conductive sheet.

(Method of Bonding Heat-conductive Sheet of Third Invention)

The adhesion of the highly heated part and the heat sink part to each other by means of the heat-conductive sheet of the third invention can be accomplished by interposing the heat-conductive sheet having a sticky surface, cut into a given shape, between the highly heated part and the heat sink part.

The adhesion of the highly heated part and the heat sink part to each other by means of the heat-conductive sheet having a sticky surface according to the third invention enables realizing satisfactory adhesion of the highly heated part and the heat sink part, so that peeling of the highly heated part and heat sink part from the heat-conductive sheet because of the expansion or shrinkage of such members caused by heat buildup from the highly heated part or because of, for example, any vibration or shock from outside can be prevented. Thus, enhancement of reliability as to heat release and semiconductor package functions can be attained. The joining of the highly heated part and the heat sink part to each other by means of the heat-conductive sheet having a sticky surface can be performed by cutting the heat-conductive sheet into a given shape and interposing the shaped heat-conductive sheet between the highly heated part and the heat sink part, which is extremely easy as compared with the formation of the heat-conductive sheet by coating or the like. Further, the heat-conductive sheet of the third invention has such an excellent elasticity that it can resist the expansion and shrinkage of members disposed in the heat sink structure. Still further, the highly heated part and the heat sink part are joined to each other by the stickiness of the heat-conductive sheet, so that, when the highly heated part such as a semiconductor element has defect, it can be easily detached and repaired. Still further, this heat-conductive sheet is excellent in the anisotropic heat conductivity in the direction of the thickness of the heat-conductive sheet because the magnetic substance and the carbon fiber are orientated in the direction of the thickness. Accordingly, the heat sink structure of high heat sink efficiency can be obtained with the use of the heat-conductive sheet.

<Heat-conductive sheet furnished with electrical insulating layer>

Part or all of the surface of the heat-conductive sheet (heat-conductive layer) according to the first to third inventions may be covered with an electrical insulating layer (fourth invention). This electrical insulating layer may contain a heat-conductive filler.

Composition for Electrical Insulating Layer

The same rubbery polymer, resinous polymer, photocuring component and thermocuring component as mentioned with respect to the formation of the binder can be used in the composition for electrical insulating layer for use in the present invention. Those which are liquid in cured or semi-cured states can preferably be used. As in the case of the binder, the rubbery polymer and resinous polymer can simultaneously function as the photocuring component and/or thermocuring component.

This composition for electrical insulating layer may be loaded with a silane coupling agent or a titanium coupling agent. Furthermore, according to necessity, the composition may be loaded with other additives such as an ultraviolet absorber, a thermal polymerization stabilizer, an antioxidant, a thermal stabilizer, an antistatic agent, a flame retardant, an adherence improver and a mildewproofing agent.

Although the components of the electrical insulating layer composition may be identical with or different from those of the binder of the heat-conductive sheet, it is preferred that the same components be employed from the viewpoint that the junction of the heat-conductive sheet and the electrical insulating layer can be strengthened.

The composition for electrical insulating layer may contain a heat-conductive filler in order to increase the heat conductivity thereof. It is preferred that the heat-conductive filler contained in the electrical insulating layer be one of such a high heat conductivity that the heat conductivity of the binder portion is not seriously deteriorated. Oxide-based ceramics, nitride-based ceramics and carbide-based ceramics can preferably be used as the heat-conductive filler.

Examples of suitable oxide-based ceramics include simple oxide ceramics such as alumina ($Al_2O_3$), zirconia ($ZrO_2$), magnesia (MgO) and beryllium oxide (BeO), and composite oxide ceramics such as mullite ($3Al_2O_3.2SiO_2$) and zircon ($ZrSiO_4$).

Examples of suitable nitride-based ceramics include silicon nitride ($Si_2N_4$), aluminum nitride (AlN), boron nitride (BN), titanium nitride (TiN), zirconium nitride (ZrN) and tantalum nitride (TaN).

Examples of suitable carbide-based ceramics include silicon carbide (SiC), titanium carbide (TiC), boron carbide ($B_4C$) and tungsten carbide (WC).

Among the oxide-based ceramics, nitride-based ceramics and carbide-based ceramics, nitride-based ceramics and oxide-based ceramics are preferably used as the heat-conductive filler in the present invention. In particular, boron nitride, aluminum nitride, alumina and magnesia are especially preferred.

These heat-conductive fillers can be used either individually or in combination.

Although the morphology of these oxide-based ceramics, nitride-based ceramics and carbide-based ceramics is not particularly limited, powdery one is generally preferred. The average particle diameter thereof in powdery form is preferably in the range of 0.1 to 100 $\mu$m, still preferably 1 to 30 $\mu$m.

When the heat-conductive filler is contained in the composition for electrical insulating layer, the content is preferably in the range of 2 to 60% by volume, still preferably 5 to 45% by volume, based on the volume of the electrical insulating layer.

The composition for electrical insulating layer can be prepared by customary procedure. The composition can be prepared by homogeneously mixing components for constituting the electrical insulating layer, such as the above rubbery polymer, resinous polymer, photocuring component and thermocuring component, with additives such as the heat-conductive filler employed according to necessity.

The viscosity of the composition for electrical insulating layer according to the present invention is preferably in the range of 10,000 to 1,000,000 cp at 25° C. The composition for electrical insulating layer is preferably in the form of a paste.

Electrical Insulating Layer

Customary techniques can be employed in sheeting the composition for electrical insulating layer for use in the present invention. For example, rolling, casting or coating can be employed. Although the thickness of the sheeted electrical insulating layer composition is varied depending on the use of the heat-conductive conductive sheet, the required heat conductivity, the required insulating performance, etc. and not particularly limited, it is generally preferred that the thickness be in the range of about 1 to 100 $\mu$m, especially 5 to 50 $\mu$m.

<Method of Forming Heat-conductive Sheet and Electrical Insulating Layer>

Figure 3:
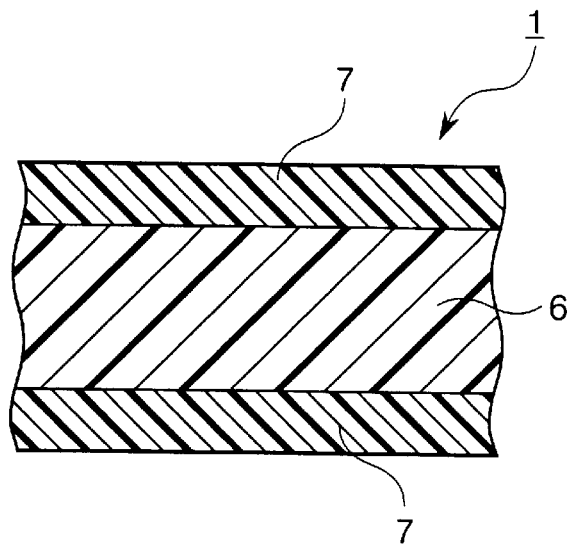
FIG. 3 is a schematic sectional view of a heat-conductive sheet comprising a heat-conductive layer and an electrical insulating layer.

As shown in FIG. 3, the heat-conductive sheet 1 furnished with the electrical insulating layer according to the fourth invention comprises the heat-conductive layer 6 wherein the carbon fiber is orientated in the binder in the direction of the thickness thereof, and the electrical insulating layer 7 covering part or all of the surface of the heat-conductive layer. According to necessity, the heat-conductive layer may contain the magnetic substance, and the electrical insulating layer may contain the heat-conductive filler.

With respect to one form of heat-conductive sheet wherein the carbon fiber and the magnetic substance are contained in the binder, the method of producing the same will be described in greater detail below.

Figure 4:
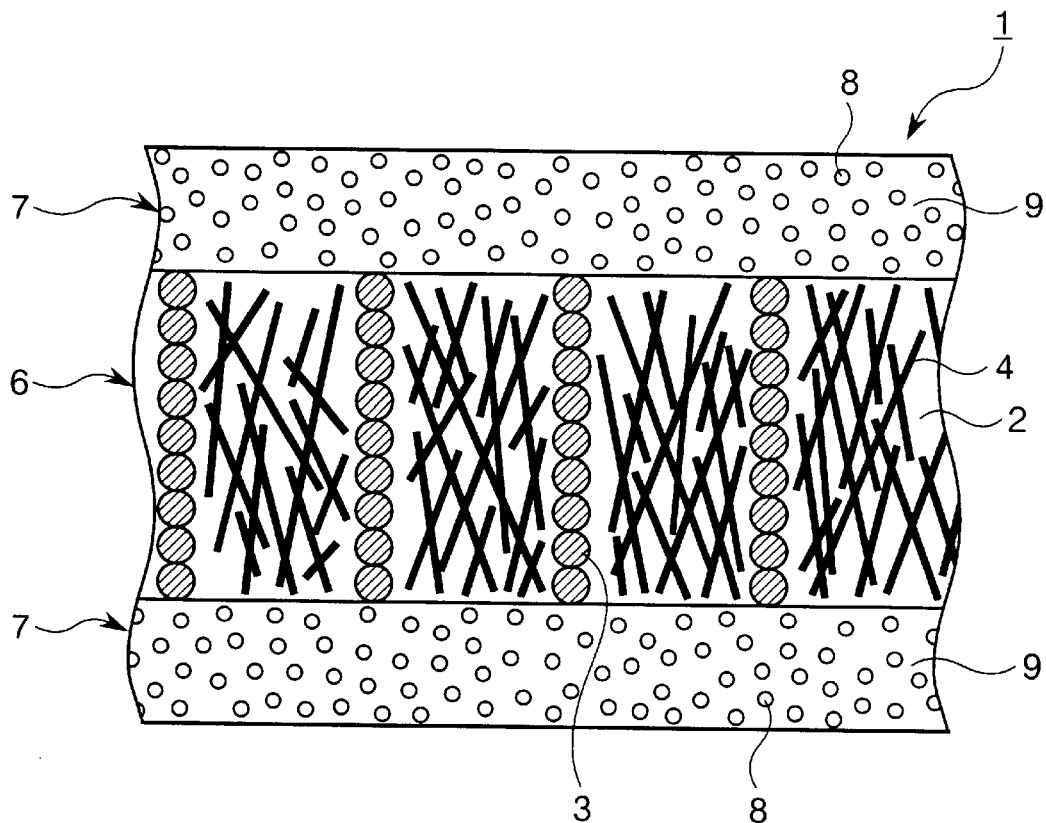
FIG. 4 is a schematic sectional view of a heat-conductive sheet comprising a heat-conductive layer and an electrical insulating layer, the heat-conductive layer containing a magnetic particle and a carbon fiber while the electrical insulating layer contains a heat-conductive filler.
Figure 5:
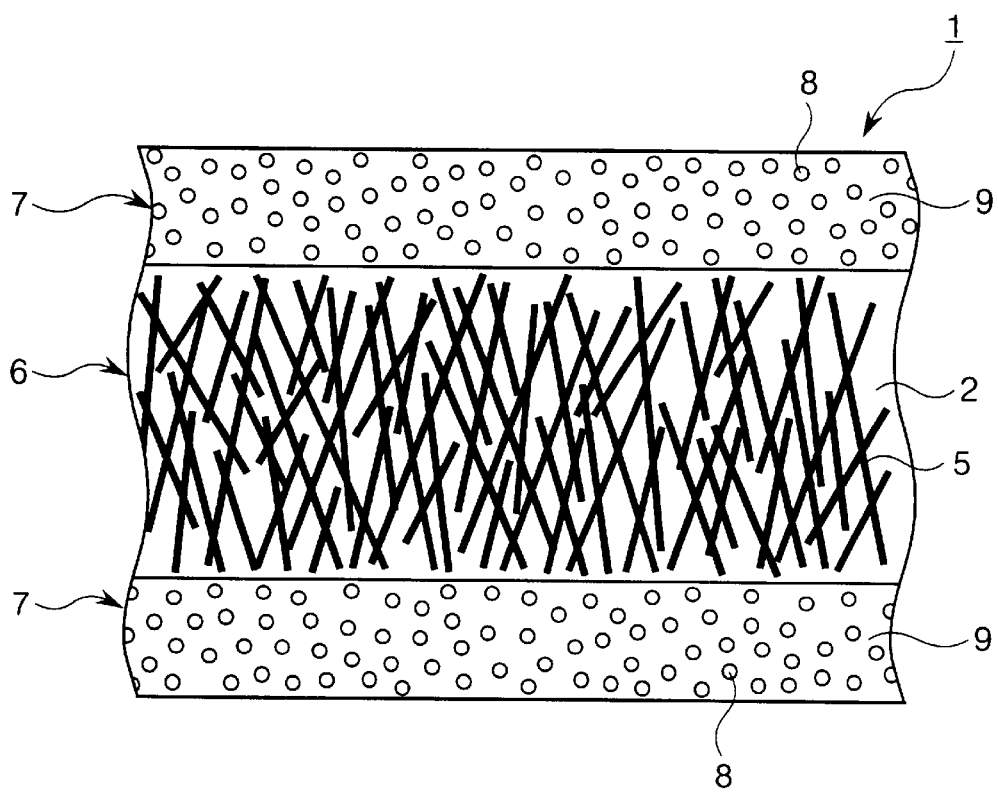
FIG. 5 is a schematic sectional view of a heat-conductive sheet comprising a heat-conductive layer and an electrical insulating layer, the heat-conductive layer containing a carbon fiber onto whose surface a magnetic substance adheres while the electrical insulating layer contains a heat-conductive filler.

Examples of obtained heat-conductive sheets are as shown in FIGS. 4 and 5. Referring to FIG. 4, the heat-conductive sheet 1 comprises the heat-conductive layer 6 wherein the carbon fiber 4 and the magnetic particles 3 are orientated in the binder 2 in the direction of the thickness of the heat-conductive sheet, and the electrical insulating layer 7 composed of the binder 9 containing the heat-conductive filler 8.

Referring to FIG. 5, the heat-conductive sheet 1 comprises the heat-conductive layer 6 wherein the carbon fiber 5 to whose surface the magnetic substance is adhering is orientated in the binder 2 in the direction of the thickness of the heat-conductive sheet, and the electrical insulating layer 7 composed of the binder 9 containing the heat-conductive filler 8.

These heat-conductive sheets are not limited as long as part or all of the surface of the heat-conductive layer portion of the heat-conductive sheet is finally covered with the electrical insulating layer. For example, the sequence of forming these layers is not particularly limited.

For example, the heat-conductive sheet of the present invention can be produced by first forming a cured sheet for electrical insulating layer, subsequently covering a surface of the electrical insulating layer sheet with a curing composition for forming a heat-conductive sheet for providing a heat-conductive layer by, for example, coating, and thereafter curing or semi-curing the curing composition for forming a heat-conductive sheet while orientating the carbon fiber in the curing composition for forming a heat-conductive sheet in the direction of the thickness of the sheet.

Alternatively, the heat-conductive sheet can be produced by first forming a heat-conductive sheet as a heat-conductive layer, subsequently covering a surface of the heat-conductive sheet with a composition for electrical insulating layer by, for example, coating, and thereafter curing or semi-curing the electrical insulating layer by heating or irradiation to thereby provide the electrical insulating layer on the surface of the heat-conductive sheet as a heat-conductive layer.

Further, the heat-conductive sheet of the present invention can be produced by separately forming a heat-conductive layer and an electrical insulating layer and adhering these to each other. In this method, when either of the heat-conductive layer and the electrical insulating layer is in the state of being semi-cured, the heat-conductive sheet exhibiting high adherence between the heat-conductive layer and the electrical insulating layer can be formed by thermocompression bonding thereof. When at least the electrical insulating layer is in the state of being semi-cured, a heat sink structure which is excellent in the bonding of highly heated part and heat sink part can be obtained by interposing the heat-conductive sheet between the highly heated part and the heat sink part and effecting thermocompression bonding thereof.

When the same binder as used in the heat-conductive sheet according to the first to third inventions is employed in the electrical insulating layer, the curing and bonding of the heat-conductive sheet furnished with the electrical insulating layer can be performed in the same manner as employed in the curing and bonding of the above curing composition for forming a heat-conductive sheet. (Heat-conductive sheet furnished with protective film)

One surface or each of both surfaces of the heat-conductive sheet of the present invention may be covered with a protective film. Also, during the process of forming the heat-conductive sheet or the electrical insulating layer, one surface or each of both surfaces thereof may be covered with a protective film.

Figure 6:
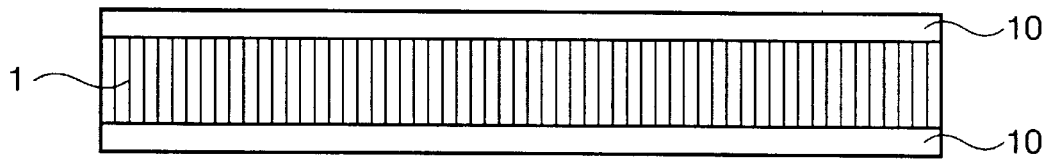
FIG. 6 is a schematic sectional view of a heat-conductive sheet covered with a protective film.
Figure 7:
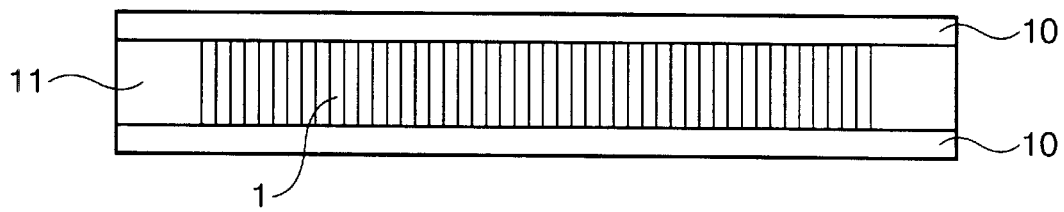
FIG. 7 is a schematic sectional view of a heat-conductive sheet covered with a protective film having a spacer.

Although one surface or each of both surfaces of the heat-conductive sheet may be covered with a protective film, it is preferred in the present invention that, for example, each of both surfaces of the heat-conductive sheet 1 be covered with a protective film 10, as shown in FIG. 6. Further, for example, the heat-conductive sheet 1 covered with two protective films may have, at peripheral portions of the sheet, spacers 11 for sustaining the two protective films 10 with a given spacing, as shown in FIG. 7. Although the material for constituting the spacers is not particularly limited, for example, SUS or polyethylene terephthalate can preferably be used. The length (thickness) along sheet thickness and the length along sheet periphery of the spacers are variable depending on the thickness and size of semi-cured heat-conductive sheet, and are not particularly limited as long as the curing composition for forming a heat-conductive sheet or the composition for electrical insulating layer can be secured.

Although the material for constituting the protective film is not particularly limited as long as it is not detrimental to magnetic field application and irradiation and is not significantly degraded by magnetic field application and irradiation, e.g., ultraviolet exposure, it is preferred that, for example, the protective film be transparent, have elasticity and light resistance and also have such a strength that peeling of the protective film from the semi-cured heat-conductive sheet, when needed for thermocompression bonding, can easily be effected without breakage. For example, the protective film is preferably composed of polyethylene terephthalate (PET), polyimide (PI), polyethylene or the like.

The thickness of the protective film, although not particularly limited, is preferably in the range of about 5 to 150 $\mu$m from the viewpoint of, for example, facilitation of peeling thereof from the heat-conductive sheet.

The method of covering the curing composition for forming a heat-conductive sheet or the composition for electrical insulating layer with protective films, although not particularly limited, can comprise, for example, rolling the curing composition for forming a heat-conductive sheet into a sheet while feeding protective films so as to have the composition interposed between the protective films. Alternatively, for example, the method can comprise holding two protective films with a given spacing in parallel relationship by means of spacers or the like and filling the space between the protective films with the above composition. At that time, a magnetic field may be applied thereto.

Further, in the process for producing the heat-conductive sheet while applying a magnetic field, the heat-conductive sheet having both surfaces thereof covered with protective films can be obtained by coating a film surface having spacers secured thereto with the curing composition for forming a heat-conductive sheet, adhering a protective film onto the curing composition for forming a heat-conductive sheet and carrying out a magnetic field application and an irradiation.

[Heat Sink Structure Including Heat-conductive Sheet]

The heat-conductive sheet according to the first to fourth inventions exhibits high heat conductivity in the direction of the thickness of the heat-conductive sheet because the magnetic substance and the carbon fiber are orientated in the binder in the direction of the thickness of the heat-conductive sheet. Specifically, the heat-conductive sheet of the present invention exhibits an anisotropic heat conductivity of about 15 to 20 W/m·K, comparable to that of SUS, in the direction of the thickness of the heat-conductive sheet. Therefore, the heat-conductive sheet of the present invention finds application in a wide spectrum of fields as a sheet relating to the heat sink structure for electrical, electronic and power generating parts, etc.

Figure 8:
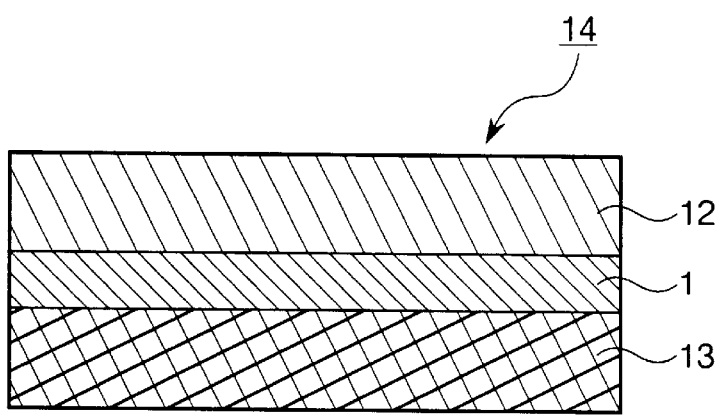
FIG. 8 is a schematic sectional view of one form of heat sink structure.
Figure 9:
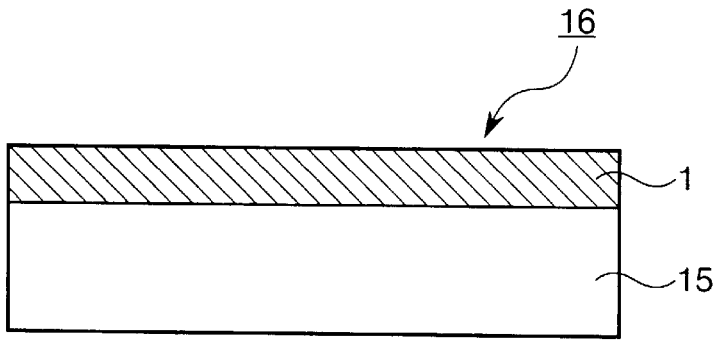
FIG. 9 is a schematic sectional view of another form of heat sink structure.
Figure 10:
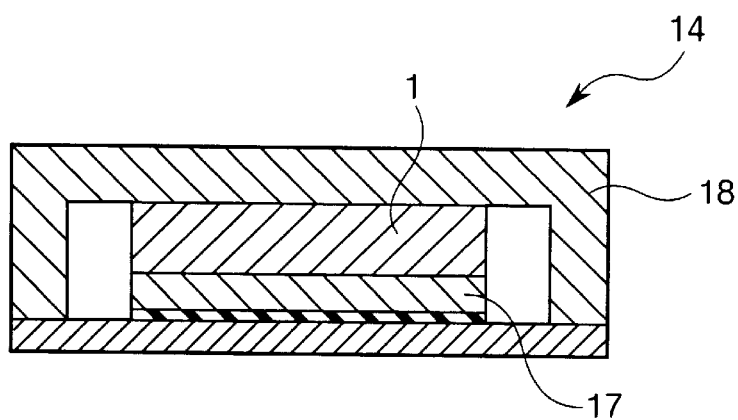
FIG. 10 is a schematic sectional view of a further form of heat sink structure.

The heat sink structure including the heat-conductive sheet of the present invention is, for example, heat sink structure 14 comprising highly heated part 12 and heat sink part 13 and, interposed therebetween, the heat-conductive sheet 1 of the present invention as shown in FIG. 8. Further, referring to FIG. 9, the heat sink structure may be heat sink structure 16 comprising highly heated part 15 on whose surface there is heat-conductive sheet 1. In producing these heat sink structures in the present invention, the shape of the heat-conductive sheet is varied depending on the use thereof and not particularly limited. The heat-conductive sheet may have any of planar, curved and cylindrical shapes. Still further, referring to FIG. 10, a specified form of heat sink structure 14 of the present invention comprises heating element 17 and heat sink member 18 joined to each other by means of the heat-conductive sheet 1 of the present invention, the heat-conductive sheet comprising a binder and a carbon fiber optionally together with a magnetic substance, the carbon fiber and the magnetic substance orientated in the direction of the thickness of the heat-conductive sheet. The heat-conductive sheet may have an electrical insulating layer containing a heat-conductive filler according to necessity. For example, a semiconductor element or a semiconductor package can be mentioned as the above heating element.

Herein, the terminology "highly heated part" with respect to the heat sink structure 14 means a heating element or a part whose temperature is higher than that of the heat sink part. The terminology "highly heated part" with respect to the heat sink structure 16 means a heating element or a solid or fluid (gas, liquid or gel) disposed on the higher-temperature side bounded by the heat-conductive sheet.

Heat sink structures of the present invention will be described below.

(I) Heat Sink Structure Comprising Highly Heated Part and Heat Sink Part Joined to Each Other by Heat-conductive Sheet (i) The heat sink structure (I) comprising a highly heated part and a heat sink part between which the heat-conductive sheet of the present invention is interposed can be used as, for example, various heat sink structures for semiconductor packages. Examples of these heat sink structures include:

1) heat sink structures wherein the highly heated part is a semiconductor element such as IC or LSI, a semiconductor package, a power transistor, a thyristor or a PTC (Positive Temperature Coefficient) element, and the heat sink.part is a heat sink member such as a heat sink plate or a heat sink fin;
2) heat sink structures wherein the highly heated part is a semiconductor element such as IC or LSI, a semiconductor package, a power transistor, a thyristor or a PTC element, and the heat sink part is a printed board, a flexible printed board, a circuit board, or the like;
3) heat sink structures wherein the highly heated part is a printed board, a flexible printed board, a circuit board, or the like, and the heat sink part is a heat sink member such as a heat sink plate or a heat sink fin; and
4) heat sink structures wherein the highly heated part is a heat sink plate, and the heat sink part is a heat sink member such as a heat sink fin.

When the heat-conductive sheet of the present invention is used in these fields, the sticky sheet (b) of the first invention or the anchoring sheet (c) of the second invention can preferably be employed as the heat-conductive sheet. In the event that sheet repairability in the heat sink structure fitted with the heat-conductive sheet is required, the heat-conductive sheet of the third invention is preferably employed. Further, in the event that insulating properties are required, the heat-conductive sheet of the fourth invention can be employed.

When use is made in the form of anchoring sheet, the semi-cured heat-conductive sheet is preferably cured by thermocompression bonding before application during the process of producing semiconductor packages and the like.

The use of the heat-conductive sheet of the present invention in these structures enables realizing heat sink structures which are strikingly excellent in the heat conduction from highly heated part to heat sink part because the heat-conductive sheet exhibits high heat conductivity in the direction of the thickness of the sheet.

The heat-conductive sheet of the present invention contains electrically conductive materials such as the carbon fiber and hence has antistatic properties, so that static electricity occurring in semiconductor package, etc. or occurring at the thermocompression bonding of highly heated part and heat sink part can be lessened. Further, the heat-conductive sheet of the present invention is highly elastic, exhibits high cushioning properties and is excellent in damping characteristics, so that the damaging of semiconductor packages due to vibration and shock imparted thereto can be prevented.

(ii) Other examples of the heat sink structures (I) of the present invention include the following.

1) Heat sink. structures wherein the highly heated part is an external heater for thermocompression bonding, and the heat sink part is a member to be thermocompression-bonded such as a plasma display, an EL panel, an LD, an LED or a printed board.

In the thermocompression bonding of a flexible printed board and a member to be compression-bonded such as a plasma display, an EL panel, an LD, an LED or a printed board to each other, the interposing of the heat-conductive sheet of the present invention between an external heater for thermocompression bonding and such a member to be compression-bonded as an auxiliary sheet for thermocompression bonding is advantageous in that the heat from the heater can effectively be transmitted so as to enable securely performing the thermocompression bonding within a short period of time.

2) Electric rotating machine wherein the highly heated part is a coil of high-voltage rotating machine and the heat sink part is an iron core.

The heat-conductive sheet of the present invention can be used to radiate heat from a heat release coil disposed in a high-voltage rotating machine, such as a power generator or a motor. For example, the heat-conductive sheet of the present invention can be used in a high-voltage rotating machine with mutually joined coil and iron core by interposing the heat-conductive sheet in the gap between a heat release coil of high-voltage rotating machine and a slot-having iron core. In this arrangement, the iron core and the coil are united to thereby enable efficiently effecting the heat conduction between the coil and the iron core with the result that the cooling performance for the high-voltage rotating machine can be enhanced. In the use of the heat-conductive sheet of the present invention in this heat sink structure, it is preferred that the semi-cured heat-conductive sheet be applied and cured by heating during the operation thereof.

3) Speaker wherein the highly heated part is a voice coil and the heat sink part is a coil portion or an auxiliary paper.

The heat-conductive sheet of the present invention can be used as a means for radiating heat from a bobbin of voice coil so as to accomplish the heat sink from a voice coil of a speaker. For example, a speaker which is excellent in the heat sink from voice coil can be obtained by winding the heat-conductive sheet of the present invention round the voice coil and further winding a coil round the same. As the heat-conductive sheet of the present invention suitable for use in this heat sink structure, there can be mentioned the anchoring sheet characterized by applying the sticky sheet or semi-cured heat-conductive sheet and curing the same by heating at the time of use. In the event that, in the heat sink structure fitted with the heat-conductive sheet, repair of the sheet is required, the use of the heat-conductive sheet of the third invention is preferred. Further, in the event that insulation is required, use can be made of the heat-conductive sheet of the fourth invention.

(II) Heat Sink Structure Wherein the Surface of Highly Heated Part is Overlaid with the Heat-conductive Sheet of the Present Invention (i) As the heat sink structure wherein the surface of highly heated part is overlaid with the heat-conductive sheet of the present invention, there can be mentioned, for example, various heat sink structures for semiconductor package, which include-the following.

1) Heat sink-structures wherein the heat sink part is a semiconductor element such as IC or LSI, a semiconductor package, a power transistor, PTC or a thyristor.

In this heat- sink structure, the heat-conductive sheet of the present invention is-joined by, for example, thermocompression bonding onto electronic parts such as a semiconductor element and a semiconductor package so that the heat sink from the semiconductor element, semiconductor package, etc. is efficiently accomplished through the heat-conductive sheet. The heat-conductive sheet of the present invention also functions as a protective sheet for semiconductor package. In the use in this field, the anchoring sheet characterized by applying the sticky sheet or semi-cured heat-conductive sheet and curing the same by heating at the time of use is preferably used as the heat-conductive sheet of the present invention. In the event that, in the heat sink structure fitted with the heat-conductive sheet, repair of the sheet is required, the use of the heat-conductive sheet of the third invention is preferred. Further, in the event that insulation is required, use can be made of the heat-conductive sheet of the fourth invention.

This heat sink structure can be one wherein the heat-conductive sheet of the present invention is used as a circuit board material, with a semiconductor element and a semiconductor package superimposed thereon. In the use as this board material, the heat-conductive sheet of the present invention is preferably used as a nonadherent sheet. In the event that insulation is required at sites whereto the heat-conductive sheet is applied, use can be made of the heat-conductive sheet of the fourth invention.

2) Heat sink structures wherein the heat sink part is a flexible printed board.

The printed board comprising a printed board such as a flexible board and, covering the same, the heat-conductive sheet of the present invention, as the heat sink part, exhibits excellent heat sink from the printed board per se. Using the sticky sheet as the heat-conductive sheet of the present invention enables facilitating temporary fixing of electronic parts at the time of mounting the same on the printed board. In the method of covering the printed board such as the flexible printed board with the heat-conductive sheet of the present invention, for example, a sheet composition is applied onto a printed board surface by coating or the like, and the applied sheet composition is cured or semi-cured by irradiation or heating while a magnetic field application is effected in the direction of the thickness of the applied sheet composition to thereby orientate the magnetic substance and the carbon fiber. Thus, the printed board covered with the heat-conductive sheet can be obtained.

(ii) Other examples of the heat sink structures (II) of the present invention include the following.

1) Heat sink structures wherein the highly heated part is a heater of a thermal fixing part of an image forming device.

The heat-conductive sheet of the present invention can be used as a fixing roll or fixing belt of a thermal fixing part of an image forming device such as a copier, a laser beam printer or a facsimile. For example, the use of the heat-conductive sheet of the present invention as a thermal fixing roll heated by a thermal fixing heater enables increasing the heat conductivity thereof, the fixing rate can be increased. In the use in this field, it is preferred that the binder comprise silicone rubber and other components capable of providing a curing product which is excellent in heat resistance and mechanical strength (e.g., Young's modulus). In the use in this field, the heat-conductive sheet is preferably used as the nonadherent sheet.

2) Heat sink structures wherein the highly heated part is a high-temperature fluid.

The heat-conductive sheet of the present invention can be employed as a material for use in a low-temperature-zone exhaust gas heat recovering device of large combustion equipments such as a boiler. For example, the heat-conductive sheet of the present invention exhibits a heat conductivity, in the direction of the thickness of the sheet, comparable to that of SUS. Therefore, in the event that the highly heated part is an, exhaust gas whose temperature is about 150° C. or below, efficient heat recovery from the exhaust gas can be accomplished by recovering heat from the exhaust gas by means of the heat-conductive sheet of the present invention and carrying out heat conduction from the highly heated part to the opposite medium through the heat-conductive sheet.

Furthermore, the heat-conductive sheet of the present invention, produced in cylindrical form, can be used as a heat exchange conduction tube in a heat exchanger. That is, heat exchange can be performed through the cylindrical heat-conductive sheet of the present invention between the medium as the highly heated part lying inside the cylinder of the heat-conductive sheet and the medium lying outside the cylinder of the heat-conductive sheet. The heat-conductive sheet can be used as a heat exchange conduction tube having excellent heat conductivity in a heat exchanger. In the use in this field, it is preferred that the binder compose of silicone rubber and other components capable of providing a curing product which is also excellent in heat resistance. The heat-conductive sheet is preferably a nonadherent sheet.

Herein, the terminology "high-temperature fluid" means a gaseous or liquid highly heated part whose temperature is higher than the temperature of the opposite solid or fluid (gaseous, liquid or gel) partitioned by the heat-conductive sheet.

3) Heat sink structures wherein the highly heated part is a light emitter such as an electric lamp.

The heat-conductive sheet of the present invention can be used in armors and heat sink parts for light emitters such as an UV lamp and an electric lamp. The heat-conductive sheet enables attaining efficient heat sink to thereby cope with heat buildup attributed to the output increase of lamps.

4) Heat sink structures wherein the highly heated part is a motor which must be capable of rotating at high speed, such as a CD-ROM drive, a CD-R/RW drive, a DVD drive or a hard disc drive.

The heat-conductive sheet of the present invention can be fitted to surfaces of motor bearings and casing parts of drives such as a CD-ROM drive, a CD-R/RW drive, a DVD drive or a hard disc drive, and can accomplish efficient heat sink from rotating parts thereof.

5) Heat sink structures wherein the highly heated part is any of a bearing part, casing part and gear part constituting a rotating member of an electric drill.

The heat-conductive sheet of the present invention can be fitted in surfaces of armors for motor and gear parts of an electric drill, and can efficiently perform heat sink from a rotating member thereof.

6) Heat sink structures wherein the highly heated part is an armor case for a battery.

The heat-conductive sheet of the present invention can be fitted to the surface of an armor part of a battery, and can efficiently perform heat sink from a battery.

EFFECT OF THE INVENTION

In the heat-conductive sheet of the first invention, the carbon fiber and the magnetic substance are orientated in the cured or semi-cured binder in the direction of the thickness of the heat-conductive sheet. Therefore, the heat-conductive sheet exhibits high anisotropic heat conductivity in the direction of the thickness of the heat-conductive sheet to thereby enable efficiently radiating heat from heating elements such as a semiconductor element and a semiconductor package. Moreover, the heat-conductive sheet is excellent in not only heat resistance, durability and mechanical strength but also adherence to heating elements. The magnetic substance is preferably a magnetic particulate, or preferably adheres to the surface of the carbon fiber.

The heat-conductive sheet of the second invention contains the thermocuring component in uncured form, and the magnetic substance and the carbon fiber are orientated in the direction of the thickness of the semi-cured heat-conductive sheet. Therefore, the heat-conductive sheet obtained by curing the semi-cured heat-conductive sheet by thermocompression bonding is excellent in not only the adherence between a heating element and a heat sink member or a circuit board but also the heat conductivity in the direction of the thickness of the heat-conductive sheet. Further, the heat-conductive sheet has excellent elasticity and durability. The above semi-cured heat-conductive sheet can be readily produced within a short molding time.

The heat-conductive sheet of the third invention has a sticky surface, so that it exhibits excellent adherence between a heating element and a heat sink member or a circuit board. Further, the heat-conductive sheet exhibits high heat conductivity because the magnetic substance and the carbon fiber are orientated in the direction of the heat-conductive sheet. Still further, the heat-conductive sheet has excellent elasticity and durability, and also has such a repairability that, in the event of any defect in heating elements, detaching as required can be easily effected. Moreover, the heat-conductive sheet of the present invention can be readily produced within a short molding time.

The heat-conductive sheet of the fourth invention comprises the heat-conductive layer, wherein the carbon fiber is orientated in the cured or semi-cured binder in the direction of the thickness of the heat-conductive sheet, and the electrical insulating layer. Therefore, the heat-conductive sheet exhibits high anisotropic heat conductivity in the thickness direction and further ensures insulation. Accordingly, the heat-conductive sheet is useful in the heat sink structure wherein insulation is required between the highly heated part such as a semiconductor element or a semiconductor package and the heat sink part. Further, the heat-conductive sheet of the present invention is excellent in not only heat resistance, durability and mechanical strength but also adherence to a heating element.

In the fifth invention, the use of the above heat-conductive sheets enables satisfying requirements relating to heat sink and heat conduction for various electrical equipments, electronic equipments, power generating equipments, etc.

EXAMPLE

The present invention will further be illustrated below with reference to the following Examples which in no way limit the scope of the invention.

Example A1

[Production of Heat-conductive Sheet Containing Magnetic Particles]

20% by volume of spherical nickel particles of 40 $\mu$m average particle diameter and 20% by volume of carbonized pitch carbon fiber (heat conductivity along fiber axis: 1400 W/m·K) of 20 $\mu$m average diameter and 200 $\mu$m average length were added to two-pack addition-type thermocuring liquid silicone rubber (viscosity: 2500 P), and mixed together in vacuum for 30 min. Thus, a curing composition for forming a heat-conductive sheet was obtained.

This composition was cast in a metal mold of magnetic substance (planar metal mold having a 2 mm deep channel) on an electromagnet arranged so as to pass magnetic lines of force through any molding in the direction of the molding thickness, thereby obtaining a molding having the form of a sheet. The molding was satisfactorily deaerated in vacuum, and the metal mold of magnetic substance was overlaid with a cover plate. Magnetic treatment by the electromagnet was performed at a magnetic field strength of about 4000 gausses at room temperature for 20 min in such a manner that magnetic lines of force were passed through the molding in the direction of the thickness of the molding. Subsequently, the molding was heated to about 100° C. and crosslinked for an hour. Thus, a heat-conductive sheet of 2 mm thickness was obtained.

<Heat Conductivity Test>

Figure 11:
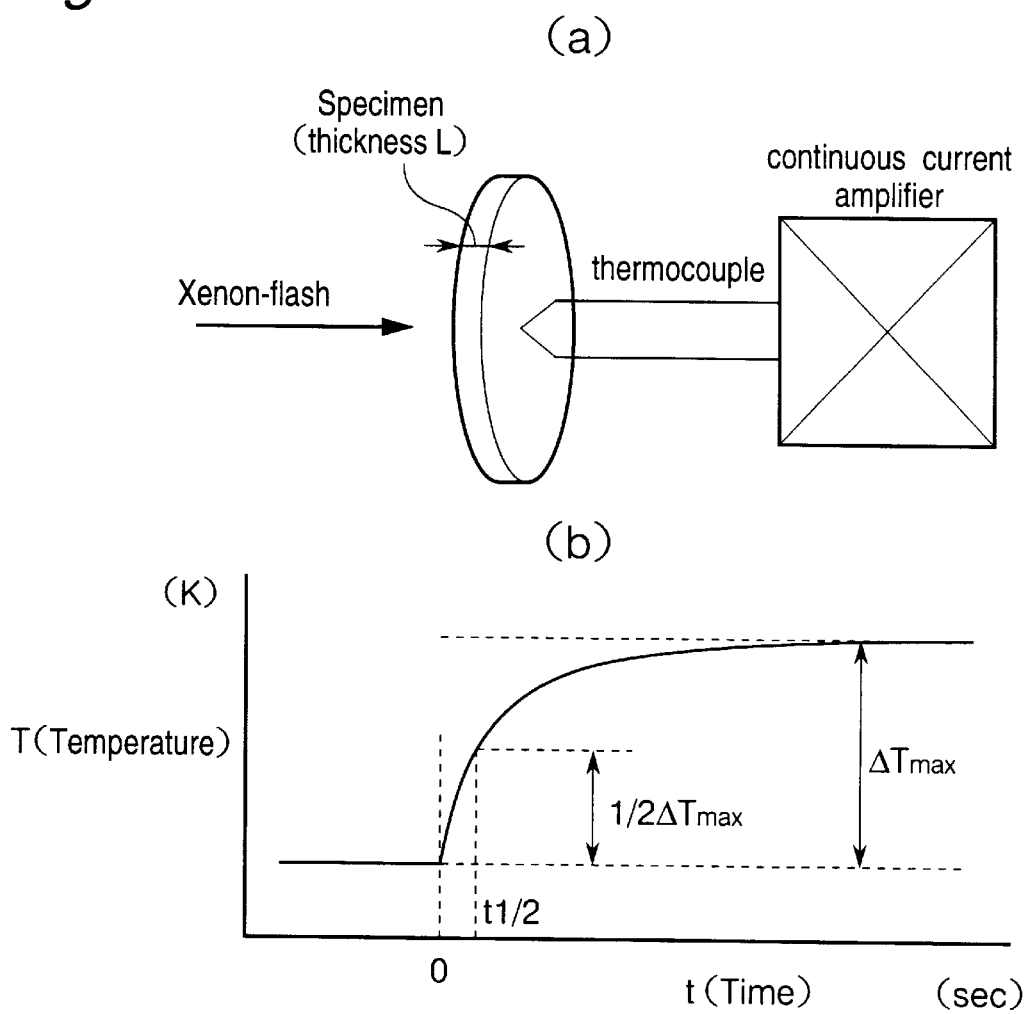
FIGS. 11(*a*) and (*b*) show the method of measuring a heat conductivity according to the Xenon-flash method.

The heat conductivity of the obtained heat-conductive sheet was measured by the Xenon-flash method. Specifically, referring to FIG. 11(a), a specimen (sheet: thickness L) fitted with a thermocouple was exposed to Xenon-flash. Referring to FIG. 11(b), the heat conductivity of the specimen was calculated from the maximum temperature increment (ΔTmax) at a back side of a side of the specimen which was exposed to Xenon-flash and from the time ($t_{1/2}$) taken to reach the temperature corresponding to ½ of ΔTmax by the formula:

heat conductivity λ(cal/cm·sec·K)==0.139(L×Q)/(ΔTmax×$t_{1/2}$)

wherein

L: thickness of specimen (cm),

Q: energy absorbed by specimen (cal/cm$^2$),

ΔTmax: maximum temperature increment at back of specimen (K), and $t_{1/2}$: time taken to reach ½ ΔTmax (sec).

Example A2

To a 60% by weight butyl acetate cellosolve solution of epoxy resin (EP154, produced by Yuka Shell Epoxy Co., Ltd.), there were added 20% by volume, based on solid contents of the solution, of spherical nickel particles of 40 μm average particle diameter and 20% by volume, based on solid contents of the solution, of carbonized pitch carbon fiber (heat conductivity along fiber axis: 1400 W/mμK) of 20 μm average diameter and 200 μm average length. Further, imidazole curing agent (2P4MHZ, produced by Shikoku Chemicals Corporation) was added in a given proportion, and homogeneously dispersed by means of a three-roll mill. Thus, a curing composition for forming a heat-conductive sheet was obtained.

This composition was cast in a metal mold of magnetic substance (planar metal mold having a 2 mm deep channel) on an electromagnet arranged so as to pass magnetic lines of force through any molding in the direction of the molding thickness. When the composition became claylike due to solvent evaporation, the metal mold of magnetic substance was overlaid with a cover plate. The same magnetic field molding treatment as in Example A1 was performed. Thus, a heat-conductive sheet of 2 mm thickness was obtained. The heat conductivity thereof was measured in the same manner as in Example A1.

Comparative Example A1

A heat-conductive sheet was obtained in the same manner as in Example A1, except that the nickel particles and carbon fiber were not added to the composition. The heat conductivity thereof was measured in the same manner as in Example A1.

Comparative Example A2

A heat-conductive sheet was obtained in the same manner as in Example A1, except that the nickel particles were not added to the composition. The heat conductivity thereof was measured in the same manner as in Example A1.

Comparative Example A3

A heat-conductive sheet was obtained in the same manner as in Example A1, except that the carbon fiber was not added to the composition. The heat conductivity thereof was measured in the same manner as in Example A1.

Comparative Example A4

A heat-conductive sheet was obtained in the same manner as in Example A1, except that carbon powder was employed in place of the carbon fiber. The heat conductivity thereof was measured in the same manner as in Example A1.

The heat conductivity values of the sheets of Examples A1 and A2 and Comparative Examples A2 to A4 were graded as "C" when the heat conductivity was less than 5 times that of the sheet of Comparative Example A1, "B" when the heat conductivity was in the range of 5 to less than 20 times that of the sheet of Comparative Example A1, and "A" when the heat conductivity was at least 20 times that of the sheet of Comparative Example A1. The results are given in Table 1.

TABLE 1

|  | Heat conductivity |
| --- | --- |
| Example A1 | A |
| Example A2 | A |
| Comp. Ex. A1 | — |
| Comp. Ex. A2 | C |
| Comp. Ex. A3 | B |
| Comp. Ex. A4 | B |

Example B1

[Production of Heat-conductive Sheet Containing Carbon Fiber having Magnetic Substance Adhering to Surface Thereof]

30% by volume of carbonized pitch carbon fiber (heat conductivity along fiber axis: 1400 W/m·K) of 20 μm average diameter and 200 μm average length having its surface covered with a nickel metal of 1 μm average film thickness by electroless plating was added to two-pack addition-type thermocuring liquid silicone rubber (viscosity: 2500 P), and mixed together in vacuum for 30 min. Thus, a curing composition for forming a heat-conductive sheet was obtained.

This composition was cast in a metal mold of magnetic substance (planar metal mold having a 2 mm deep channel) on an electromagnet arranged so as to pass magnetic lines of force through any molding in the direction of the molding thickness, thereby obtaining a molding having the form of a sheet. The molding was satisfactorily deaerated in vacuum, and the metal mold of magnetic substance was overlaid with a cover plate. Magnetic treatment by the electromagnet was performed at a magnetic field strength of about 4000 gausses at room temperature for 20 min in such a manner that magnetic lines of force were passed through the molding in the direction of the thickness of the molding. Subsequently, the molding was heated to about 100° C. and crosslinked for an hour. Thus, a heat-conductive sheet of 2 mm thickness was obtained.

<Heat conductivity test>The heat conductivity of the obtained heat-conductive sheet was measured by the Xenon-flash method in the same manner as in the above Example A1.

Example B2

To a 60% by weight butyl acetate cellosolve solution of epoxy resin (EP154, produced by Yuka Shell Epoxy Co., Ltd.), there was added 20% by volume, based on solid contents of the solution, of carbon fiber having a magnetic substance adhering to its surface (heat conductivity along fiber axis: 1400 W/m·K), prepared in the same manner as in Example B1. Further, imidazole curing agent (2P4MHZ, produced by Shikoku Chemicals Corporation) was added in a given proportion, and homogeneously dispersed by means of a three-roll mill. Thus, a curing composition for forming a heat-conductive sheet was obtained.

This composition was cast in a metal mold of magnetic substance (planar metal mold having a 2 mm deep channel) on an electromagnet arranged so as to pass magnetic lines of force through any molding in the direction of the molding thickness. When the composition became claylike due to solvent evaporation, the metal mold of magnetic substance was overlaid with a cover plate. The same magnetic field molding treatment as in Example B1 was performed. Thus, a heat-conductive sheet of 2 mm thickness was obtained.

The heat conductivity thereof was measured in the same manner as in Example B1.

Comparative Example B1

A heat-conductive sheet was obtained in the same manner as in Example B1, except that the carbon fiber having a magnetic substance adhering to its surface was not added to the composition. The heat conductivity thereof was measured in the same manner as in Example B1.

Comparative Example B2

A heat-conductive sheet was obtained in the same manner as in Example B1, except that a carbon fiber not coated with any magnetic substance layer was added to the composition. The heat conductivity thereof was measured in the same manner as in Example B1.

The heat conductivity values of the sheets of Examples B1 and B2 and Comparative Examples B1 and B2 were graded as "C" when the heat conductivity was less than 5 times that of the sheet of Comparative Example B1, "B" when the heat conductivity was in the range of 5 to less than 20 times that of the sheet of Comparative Example B1, and "A" when the heat conductivity was at least 20 times that of the sheet of Comparative Example B1. The results are given in Table 2.

TABLE 2

|  | Heat conductivity |
| --- | --- |
| Example B1 | A |
| Example B2 | A |
| Comp. Ex. B1 | — |
| Comp. Ex. B2 | C |

Example C1
[Production of Semi-cured Heat-conductive sheet]

To a mixture consisting of 60 parts of polyethylene glycol dimethacrylate (PDE400, produced by Kyoeisha) and 40 parts of bisphenol A type epoxy resin (EP1001, produced by Yuka Shell Epoxy Co., Ltd.), there were added 3% by weight, based on methacrylate, of photoinitiator (Irgacure 651, produced by Ciba-Geigy), 10% by weight, based on epoxy resin, of imidazole curing agent (2P4MHZ-PW, produced by Shikoku Chemicals Corporation) and 15% by volume of carbonized pitch carbon fiber (heat conductivity along fiber axis: 1400 W/m·K) of 10 $\mu$m average diameter and 200 $\mu$m average length having its surface covered with a nickel metal of 1 $\mu$m average film thickness by electroless plating. The mixture was mixed together in vacuum for 30 min. Thus, a curing composition for forming a heat-conductive sheet was obtained.

The space between two PET films (each 50 $\mu$m thick) placed in parallel relationship with 0.2 mm thick spacers, disposed on an electromagnet arranged so as to pass magnetic lines of force through any shaped item in the direction of the thickness thereof, was filled with the above composition, thereby obtaining a sheet-shaped item. Magnetic treatment by the electromagnet was performed at a magnetic field strength of about 4000 gausses at room temperature for 20 min in such a manner that magnetic lines of force were passed through the shaped item in the direction of the thickness of the shaped item. Subsequently, while continuing the magnetic field application, the upper side of the sheet was irradiated with ultraviolet light for 1 min by means of an ultraviolet irradiation equipment. Thus, a 0.2 mm thick semi-cured heat-conductive sheet was obtained.
[Evaluation of Performance of Heat-conductive Cured Layer]

The obtained semi-cured heat-conductive sheet was interposed between a 30 mm square silicon wafer and a 30 $\mu$m thick copper foil, and thermocompression bonding was effected by applying a press plate heated at 150° C. from upward at a pressure of 1 kg/cm$^2$ for 30 min. With respect to the compression-bonded wafer/heat-conductive sheet/copper foil, the copper foil was peeled from the cured heat-conductive sheet layer according to the following method. Thus, the peel strength was measured to thereby evaluate the adherence thereof. Further, the heat-conductive sheet was thermocured in the state of being interposed between two Teflon films (50 $\mu$m thick) under the same conditions, and the Teflon films were peeled off. The heat conductivity of the obtained heat-conductive sheet was evaluated by the following method.

<Peel Strength Test (Adherence Test)>

The adhesive strength was evaluated in accordance with Japanese Industrial Standard C6481 by the use of adhesive strength tester (manufactured by YAMAMOTO-MS Co., Ltd.).

<Heat Conductivity Test>

The heat conductivity of the obtained heat-conductive sheet was measured by the same Xenon-flash method as described in Example A1 above.

Example C2

A semi-cured heat-conductive sheet was obtained in the same manner as in Example C1, except that, in place of the carbon fiber having the nickel metal adhering to its surface, there were added 20% by volume of spherical nickel particles of 40 $\mu$m average particle diameter and 20% by volume of carbonized pitch carbon fiber (heat conductivity along fiber axis: 1400 W/m·K) of 20 $\mu$m average diameter and 200 $\mu$m average length. Not only thermocompression bonding but also measuring of peel strength and heat conductivity were carried out in the same manner as in Example C1.

Comparative Example C1

A curing composition for forming a heat-conductive sheet was obtained in the same manner as in Example C1, except that only the polyethylene glycol dimethacrylate was used without the mixing of the bisphenol A type epoxy resin. This composition was sheeted and cured by ultraviolet irradiation, thereby obtaining a semi-cured resin sheet, in the same manner as in Example C1. The obtained semi-cured resin sheet was subjected to thermocompression bonding, and the peel strength and heat conductivity were measured, in the same manner as in Example C1. With respect to the compression-bonded wafer/heat-conductive sheet/copper foil, the copper foil was peeled from the cured heat-conductive sheet layer, thereby measuring the peel strength and evaluating the adherence thereof, in the following manner. Further, the heat-conductive sheet was thermocured in the state of being interposed between two Teflon films (50 µm thick) under the same conditions, and the Teflon films were peeled off. The heat conductivity of the obtained heat-conductive sheet was evaluated by the following method.

Comparative Example C2

A curing composition for forming a heat-conductive sheet was obtained in the same manner as in Example C1, except that only the bisphenol A type epoxy resin was used without the mixing of the polyethylene glycol dimethacrylate. In the same manner as in Example C1, this composition was sheeted, subjected to magnetic field application at room temperature, heated to 100° C. and cured for 1 hr. Thus, a 0.2 mm thick cured sheet was obtained. The obtained cured sheet was subjected to thermocompression bonding, and the peel strength and heat conductivity were measured, in the same manner as in Example C1. With respect to the compression-bonded wafer/heat-conductive sheet/copper foil, the copper foil was peeled from the cured heat-conductive sheet layer, thereby measuring the peel strength and evaluating the adherence thereof, in the following manner. Further, the heat-conductive sheet was thermocured in the state of being interposed between two Teflon films (50 µm thick) under the same conditions, and the Teflon films were peeled off. The heat conductivity of the obtained heat-conductive sheet was evaluated by the following method.

Comparative Example C3

A curing composition for forming a heat-conductive sheet was obtained in the same manner as in Example C1, except that 15% by volume of carbonized pitch carbon fiber (heat conductivity along fiber axis: 1400 W/m·K) of 10 µm average diameter and 200 µm average length having its surface not covered with any nickel metal plating was added to the composition and mixed together in vacuum for 30 min. This composition was sheeted and cured by ultraviolet irradiation, thereby obtaining a semi-cured sheet, in the same manner as in Example C1. The obtained semi-cured sheet was subjected to thermocompression bonding, and the peel strength and heat conductivity were measured, in the same manner as in Example C1. With respect to the compression-bonded wafer/heat-conductive sheet/copper foil, the copper foil was peeled from the cured heat-conductive sheet layer, thereby measuring the peel strength and evaluating the adherence thereof, in the following manner. Further, the heat-conductive sheet was thermocured in the state of being interposed between two Teflon films (50 µm thick) under the same conditions, and the Teflon films were peeled off. The heat conductivity of the obtained heat-conductive sheet was evaluated by the following method.

The peel strength values of the sheets of Examples C1 and C2 and Comparative Examples C1, C2 and C3 were graded as "C" when the peel strength was less than 5 times that of the sheet of Comparative Example C1, "B" when the peel strength was in the range of 5 to less than 20 times that of the sheet of Comparative Example C1, and "A" when the peel strength was at least 20 times that of the sheet of Comparative Example C1. The results are given in Table 3.

The heat conductivity values of the sheets of Examples C1 and C2 and Comparative Examples C1, C2 and C3 were graded as "C" when the heat conductivity was less than 5 times that of the sheet of Comparative Example C3, "B" when the heat conductivity was in the range of 5 to less than 20 times that of the sheet of Comparative Example C3, and "A" when the heat conductivity was at least 20 times that of the sheet of Comparative Example C3. The results are given in Table 3.

TABLE 3

|  | Peel strength | Heat conductivity |
|---|---|---|
| Example C1 | A | A |
| Example C2 | A | A |
| Comp. Ex. C1 | — | A |
| Comp. Ex. C2 | C | A |
| Comp. Ex. C3 | A | — |

Synthetic Example 1
[Synthesis of Copolymer (1)]

A monomer mixture consisting of 94 parts of 2-ethylhexyl acrylate, 3 parts of acrylonitrile, 1 part of acrylic acid and 2 parts of N-methylolacrylamide, as specified in Table 4, was prepared. 40 parts of water and 0.4 part of sodium persulfate as a polymerization initiator were charged into an autoclave equipped with an agitator, a thermostat and a reflux condenser, and heated to 70° C. 100 parts of the monomer mixture, 0.02 part of n-butylmercaptan as a molecular weight regulator, 1.0 part of sodium dodecylbenzene-sulfonate as an emulsifier, 1.0 part of polyoxyethylene nonylphenyl ether and 60 parts of water were added and agitated to thereby effect emulsification. Thus, a preemulsion was obtained. While continuously feeding the whole amount of preemulsion into the autoclave over a period of 3 hours, polymerization of the monomer mixture was performed under agitation at 80° C. Further, agitation was continued at 80° C. for 2 hours and a half to thereby complete the polymerization reaction. Thus, there was obtained a water-base emulsion of polymer particles composed of a copolymer of 2-ethylhexyl acrylate, acrylonitrile, acrylic acid and N-methylolacrylamide. The constituent component proportion, number average molecular weight in terms of polystyrene and glass transition temperature of copolymer (1) contained in the water-base emulsion are given in Table 4.

The number average molecular weight in terms of polystyrene and glass transition temperature were measured by the following method.

<Conditions for Measuring Number Average Molecular Weight in Terms of Polystyrene>

Measuring was performed according to the customary method with the use of gel permeation chromatograph (HCL-8020, manufactured by Tosoh Corporation).

<Conditions for Measuring Glass Transition Temperature>

Measuring was performed according to the customary method with the use of differential scanning calorimeter (model SSC-500 manufactured by Seiko Instruments Inc.) according to the customary method.

Synthetic Examples 2 to 4

Monomer mixtures were prepared at proportions specified in Table 4, and water-base emulsions containing polymer particles composed of copolymer (2), copolymer (3) and copolymer (4) respectively were produced in the same manner as in Example D1 below. The constituent component proportions, number average molecular weights in terms of polystyrene and glass transition temperatures of copolymers (2) to (4) contained in the water-base emulsions are given in Table 4.

Example D1

[Preparation of Binder]

50 parts of lauryl methacrylate as a monomer having an unsaturated bond and 2 parts of photoinitiator (Irgacure 651, produced by Ciba-Geigy) were added to 50 parts of solid copolymer (1) obtained by distilling off water from the water-base emulsion synthesized in Synthetic Example 1, and agitated so that a homogeneous solution was obtained. Thus, a binder for heat-conductive sheet was obtained.

[Production of Heat-conductive Sheet]

To this binder, there was added 15% by volume of carbonized pitch carbon fiber (heat conductivity along fiber axis: 1400 W/m·K) of 10 μm average diameter and 200 μm average length having its surface covered with a nickel metal of 1 μm average film thickness by electroless plating. The mixture was agitated together in vacuum for 30 min. Thus, a curing composition for forming a heat-conductive sheet was obtained.

The curing composition was filled into the space between two PET films (each 50 μm thick) placed in parallel relationship with 0.2 mm thick spacers, disposed on an electromagnet arranged so as to pass magnetic lines of force through any shaped item in the direction of the thickness thereof, thereby obtaining a sheet-shaped item. Magnetic treatment by the electromagnet was performed at a magnetic field strength of about 4000 gausses at room temperature for 20 min in such a manner that magnetic lines of force were passed through the shaped item in the direction of the thickness of the shaped item. Subsequently, while continuing the magnetic field application, the upper side of the sheet was irradiated with ultraviolet light for 1 min by means of an ultraviolet irradiation equipment. Thus, there was obtained a 0.2 mm thick cured heat-conductive sheet having both surfaces thereof covered with the PET films.

[Evaluation of Performance of Heat-conductive Sheet]

The heat-conductive sheet, after peeling off of the both-side PET films, was interposed between a 30 mm square silicon wafer obtained by cutting out and a 30 μm thick copper foil, and compression bonding was effected at room temperature under a pressure of 1 kg/cm² from upward for 30 min. With respect to the compression-bonded wafer/heat-conductive sheet/copper foil, peeling was performed between the wafer and the heat-conductive sheet and between the heat-conductive sheet and the copper foil to thereby determine the peel strength and evaluate the stickiness according to the following method.

Further, the heat conductivity of the heat-conductive sheet, after peeling off of the both-side PET films, was evaluated by the following method.

<Stickiness Test>

The stickiness was evaluated by the use of adhesive strength tester (manufactured by YAMAMOTO-PLATING TESTING DEVICE Co., Ltd.) in accordance with Japanese Industrial Standard H8630.

<Heat Conductivity Test>

Figure 12:
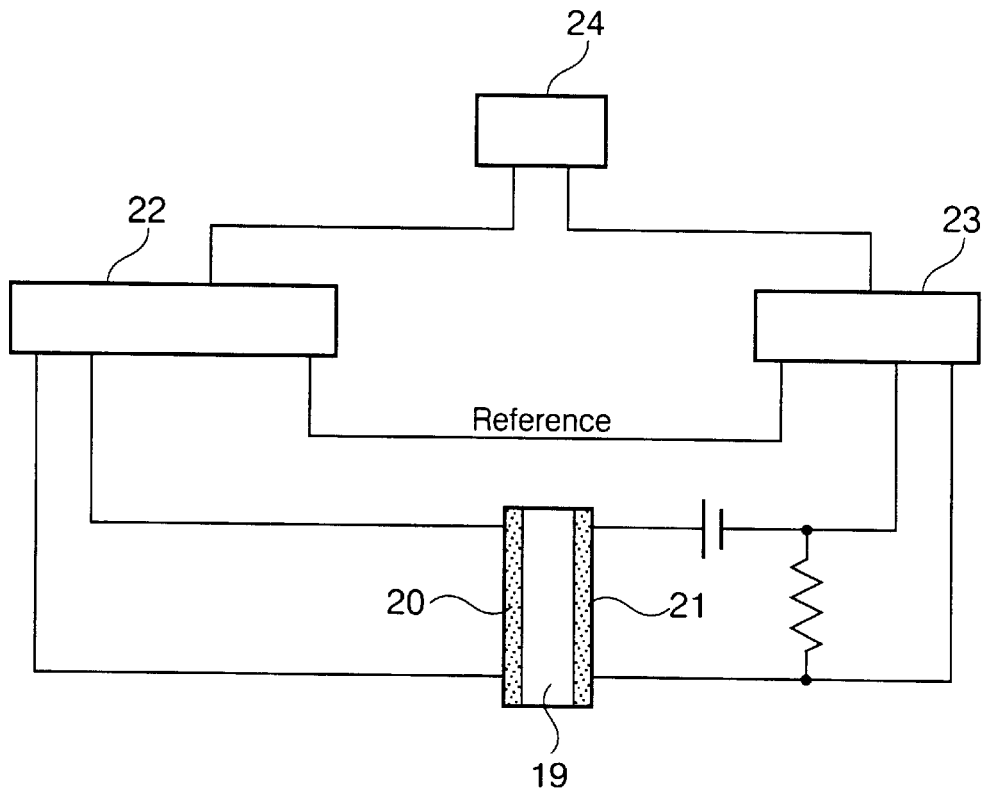
FIG. 12 shows the method of measuring a heat conductivity according to the heat alternating current method.

FIG. 12 is for explaining how to evaluate the thermal diffusivity of heat-conductive sheet by the heat alternating current method. The heat conductivity (λ) of heat-conductive composite sheet in the direction of the thickness thereof can be determined by measuring a temperature change phase difference (Δθ) by the heat alternating current method, calculating the thermal diffusivity (α) on the basis of the relationship of the following formula (2) therefrom, and introducing the thermal diffusivity (α) together with the values of heat capacity and density separately measured by customary methods into the following formula (1).

Figure 13:
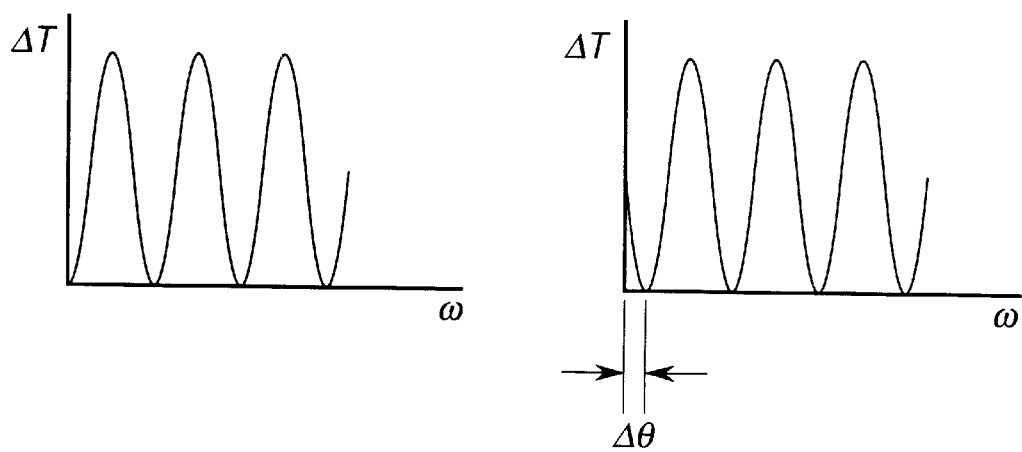
FIG. 13 shows a phase difference of temperature change with respect to the method of measuring a heat conductivity according to the heat alternating current method.

Referring to FIG. 12, the system for measuring the temperature change phase difference (Δθ) by the heat alternating current method comprises function generator 22, lock-in amplifier 23, personal computer 24, sample 19 and electrodes 20, 21. The sample 19 on its both surfaces was interposed between the electrodes 20, 21 (thin metal coating provided on glass plate by sputtering). One side of the sample 19 was heated by applying an alternating current to one-side electrode 20. Temperature change was detected from the resistance change of the other electrode 21. Referring to FIG. 13, the phase difference (Δθ) of temperature change (ΔT) was measured from any response delay. The thermal diffusivity (α) was calculated by the formula (2), and the heat conductivity (λ) was calculated by the formula (1). Under ordinary conditions, measuring was performed in such a manner that sample compression was minimized.

Formula (1):

$$\lambda = \alpha \times Cp \times \rho$$

wherein

λ: heat conductivity,

α: thermal diffusivity,

Cp: heat capacity (specific heat), and

ρ: density.

Formula (2):

$$\Delta\theta = \sqrt{(\pi f/\alpha)} \times d + \pi/4$$

wherein

Δθ: phase difference of temperature change, f: heating frequency, d: thickness of sample, and α: thermal diffusivity.

Example D2

A heat-conductive sheet was obtained in the same manner as in Example D1, except that a binder for heat-conductive sheet was prepared by adding 40 parts of 2-ethylhexyl acrylate as a monomer having an unsaturated bond and 2 parts of photoinitiator (Irgacure 651, produced by Ciba-Geigy) to 60 parts of solid copolymer (2) obtained by distilling off water from the emulsion of copolymer (2) synthesized in Synthetic Example 2, and agitating the mixture so that a homogeneous solution was obtained.

Example D3

A heat-conductive sheet was obtained in the same manner as in Example D1, except that a binder for heat-conductive sheet was prepared by adding 60 parts of isononyl acrylate as a monomer having an unsaturated bond and 2 parts of photoinitiator (Irgacure 651, produced by Ciba-Geigy) to 40 parts of solid copolymer (3) obtained by distilling off water from the emulsion of copolymer (3) synthesized in Synthetic Example 3, and agitating the mixture so that a homogeneous solution was obtained.

Comparative Example D1

A heat-conductive sheet was obtained in the same manner as in Example D1, except that a binder for heat-conductive sheet was prepared by adding 60 parts of isononyl acrylate as a monomer having an unsaturated bond and 2 parts of photoinitiator (Irgacure 651, produced by Ciba-Geigy) to 40 parts of solid copolymer (4) obtained by distilling off water from the emulsion of copolymer (4) synthesized in Synthetic Example 4, and agitating the mixture so that a homogeneous solution was obtained.

Comparative Example D2

A curing composition for forming a heat-conductive sheet was obtained in the same manner as in Example D1, except that, in place of the carbonized pitch carbon fiber having its surface plated with nickel metal, use was made of 15% by volume of carbonized pitch carbon fiber (heat conductivity along fiber axis: 1400 W/m·K) of 10 μm average diameter and 200 μm average length having its surface not plated with nickel metal. In the same manner as in Example D1, this composition was sheeted and subjected to ultraviolet curing, thereby obtaining a heat-conductive sheet.

(Evaluation)

The stickiness values of the sheets of Examples D1, D2 and D3 and Comparative Examples D1 and D2 were graded as "C" when the stickiness was less than 200 g/cm and "A" when the stickiness was 200 g/cm or greater. The results are given in Table 5.

The peeling properties of the sheets of Examples D1, D2 and D3 and Comparative Examples D1 and D2 were graded as "C" when sheet fragments are adhering to the adherend, or the sheet is broken, and "A" when there is no sheet fragment adhering to the adherend, and the sheet is not broken, in the observation of test pieces after the above stickiness test. The results are given in Table 5.

The heat conductivity values of the sheets of Examples D1, D2 and D3 and Comparative Example D1 were graded as "C" when the heat conductivity was less than 5 times that of the sheet of Comparative Example D2, "B" when the heat conductivity was in the range of 5 to less than 20 times that of the sheet of Comparative Example D2, and "A" when the heat conductivity was at least 20 times that of the sheet of Comparative Example D2. The results are given in Table 5.

TABLE 4

| Added compound (pts. wt.) | | Synthetic Ex. 1 Copolymer (1) | Synthetic Ex. 2 Copolymer (2) | Synthetic Ex. 3 Copolymer (3) | Synthetic Ex. 4 Copolymer (4) |
|---|---|---|---|---|---|
| added monomer | 2-ethylhexyl acrylate | 94 | — | — | 58 |
| | isononyl acrylate | — | 90 | 20 | — |
| | lauryl methacrylate | — | — | 73 | — |
| | acrylonitrile | 3 | 5 | 4 | — |
| | acrylic acid | 1 | — | 1 | 2 |
| | methacrylic acid | — | 1 | — | — |
| | butyl acrylate | — | 4 | — | — |
| | methyl methacrylate | — | — | 2 | 40 |
| | N-methylol-acrylamide | 2 | — | — | — |
| additive | n-butylmercaptan | 0.02 | 0.02 | 0.02 | 0.02 |
| | Sodium-dodecylbenzene-sulfonate | 1.0 | 1.0 | 1.0 | 1.0 |
| Mm in terms of polystyrene ×10⁴ | | 1.6 | 3.0 | 2.7 | 1.8 |
| Glass transition temp. (° C.) | | −64 | −73 | −62 | −22 |

TABLE 5

| | Binder (pts) | | | Photo initiator (pts) | Carbon fiber | Magnetic substance | Stickiness to silicone wafer | to Cu foil | Peel strength | Heat Conductivity |
|---|---|---|---|---|---|---|---|---|---|---|
| | Copolymer (A) | | Monomer (B) | | | | | | | |
| Example D1 | Copolymer (1) | 50 | lauryl methacrylate | 50 | 2 | A | A | A | A | A | A |
| Example D2 | Copolymer (2) | 60 | 2-ethylhexyl acrylate | 40 | 2 | A | A | A | A | A | A |
| Example D3 | Copolymer (3) | 40 | isononyl acrylate | 60 | 2 | A | A | A | A | A | A |
| Comp. Ex. D1 | Copolymer (4) | 40 | isononyl acrylate | 60 | 2 | A | A | C | C | C | A |
| Comp. Ex. D2 | Copolymer (1) | 50 | lauryl methacrylate | 50 | 2 | A | C | A | A | A | — |

Example E1

[Production of Heat-conductive Sheet Furnished with Electrical Insulating Layer]

15% by volume of carbonized pitch carbon fiber (heat conductivity along fiber axis: 1400 W/m·K) of 10 μm average diameter and 200 μm average length having its surface covered with a nickel metal of 1 μm average film thickness by electroless plating was added to two-pack addition-type thermocuring liquid silicone rubber (viscosity: 100 P), and mixed together in vacuum for 30 min. Thus, a composition for heat-conductive layer (A) was obtained.

25% by volume of BN (boron nitride) powder of 3 μm average particle diameter was added to the same type of silicone rubber as above, and mixed together in vacuum for 30 min. A PET:film (thickness: 50 μm) was coated with the obtained silicone rubber composition so that the composition had a thickness of about 20 μm. Thereafter, heating was effected at 100° C. for 30 min to thereby obtain an electrical insulating sheet having its one side protected by PET.

The above composition for heat-conductive layer was filled into the space between two pieces of the above electrical insulating sheet with PET film placed in parallel relationship with 0.2 mm thick spacers with the PET film lying outside, disposed on an electromagnet arranged so as to pass magnetic lines of force through any sheet in the direction of the thickness thereof, thereby obtaining a shaped item sheet. Magnetic treatment by the electromagnet was performed at a magnetic field strength of about 4000 gausses at room temperature for 20 min in such a manner that magnetic lines of force were passed through the shaped item sheet in the direction of the thickness of the shaped item sheet. Subsequently, while continuing the magnetic field application, the shaped item sheet was heated at 100° C., thereby obtaining a cured sheet. The PET films were removed from both sides of the cured sheet, thereby obtaining a 0.24 μm thick heat-conductive sheet having its both surfaces covered with electrical insulating layers.

The heat conductivity and electrical insulating properties of the obtained heat-conductive sheet were evaluated by the following methods. The obtained results are given in Table 6.

<Heat Conductivity Test>

The heat conductivity was evaluated by measuring the thermal diffusivity of the obtained heat-conductive sheet by the heat alternating current method and calculating therefrom together with the values of heat capacity and density separately measured by customary methods in the same manner as in Example D1 above.

<Electrical Insulating Property Test>

The electrical insulating property was evaluated by interposing the obtained heat-conductive sheet between two copper plates having surfaces thereof plated with gold and measuring the electrical resistance between the copper plates.

Example E2

To a mixture composed of 60 parts of polyethylene glycol dimethacrylate (PDE400, produced by Kyoeisha co., Ltd.) and 40 parts of bisphenol A type epoxy resin (EP1001, produced by Yuka Shell Epoxy Co., Ltd.), there were added 3% by weight, based on methacrylate, of photoinitiator (Irgacure 651, produced by Ciba-Geigy Co., Ltd.) and 10% by weight, based on epoxy resin, of imidazole curing agent (2P4MHZ-PW, produced by Shikoku Chemicals Corporation) to thereby obtain binder (I). 15% by volume of carbonized pitch carbon fiber (heat conductivity along fiber axis: 1400 W/m·K) of 10 μm average diameter and 200 μm average length having its surface covered with a nickel metal of 1 μm average film thickness by electroless plating was added to the binder (I), and mixed together in vacuum for 30 min. Thus, a composition for heat-conductive layer (B) was obtained.

25% by volume of BN (boron nitride) powder of 3 μm average particle diameter was added to the binder (I) composed of the same components as above, and mixed together in vacuum for 30 min. A PET film (50 μm) was coated with the obtained binder composition so that the composition had a thickness of about 20 μm. Thereafter, heating was effected at 100° C. for 30 min to thereby obtain an electrical insulating sheet having its one side protected by PET.

The above composition for heat-conductive layer (B) was filled into the space between two PET films placed in parallel relationship with 0.2 mm thick spacers, disposed on an electromagnet arranged so as to pass magnetic lines of force through any sheet in the direction of the thickness thereof, thereby obtaining a sheeted heat-conductive composition. Magnetic treatment by the electromagnet was performed at a magnetic field strength of about 4000 gausses at room temperature for 20 min in such a manner that magnetic lines of force were passed through the sheeted composition in the direction of the thickness of the sheeted composition. Subsequently, while continuing the magnetic field application, the upper side of the sheeted composition was irradiated with ultraviolet light for 1 min by means of an ultraviolet irradiation equipment. Thus, there was obtained a 0.2 mm thick semi-cured sheet for constituting a heat-conductive layer. The both-side PET films were removed, and the resultant heat-conductive sheet was interposed between two pieces of the above electrical insulating sheet having its one side protected by PET film, with the PET film arranged so as to lie outside. Heating was performed while applying pressure by means of a heating press, and the PET films were peeled off. Thus, there was obtained a 0.24 mm thick cured heat-conductive sheet.

The heat conductivity test and electrical insulating property test of the obtained heat-conductive sheet were carried out in the same manner as in Example E1.

Comparative Example E1

A sheet was produced in the same manner as in Example E1, except that, in place of the use of the electrical insulating sheet, the composition for the heat-conductive layer (A) was filled into the space between two PET films (each 50 μm) not furnished with any electrical insulating layer, placed in parallel relationship with 0.24 mm thick spacers, and that the sheet was heated at 100° C. and cured without the application of magnetic field.

The heat conductivity test and electrical insulating property test of the obtained sheet were carried out in the same manner as in Example E1.

Comparative Example E2

A sheet was produced in the same manner as in Example E1, except that, in place of the use of the electrical insulating sheet, the compostion for heat-conductive layer (A) was filled into the space between two PET films (each 50 μm) not furnished with any electrical insulating layer, placed in parallel relationship with 0.24 mm thick spacers.

The heat conductivity test and electrical insulating property test of the obtained sheet were carried out in the same manner as in Example E1.

Comparative Example E3

A sheet was produced by curing the composition for heat-conductive layer (B) under the application of magnetic field in the same manner as in Example E2, except that the electrical insulating sheet was not employed.

The heat conductivity test and electrical insulating property test of the obtained sheet were carried out in the same manner as in Example E1.

The heat conductivity values of the sheets of Examples E1 and E2 and Comparative Examples E1, E2 and E3 were graded as "C" when the heat conductivity was less than 5 times that of the sheet of Comparative Example E1, "B" when the heat conductivity was in the range of 5 to less than 20 times that of the sheet of Comparative Example E1, and "A" when the heat conductivity was at least 20 times that of the sheet of Comparative Example E1. With respect to the electrical insulating property test, the grade was "A" when the resistance was 10 MΩ or more, and "C" when the resistance was less than 10 MΩ. The results are given in Table 6.

TABLE 6

|  | Heat conductivity | Electrical insulation |
|---|---|---|
| Example E1 | A | A |
| Example E2 | A | A |
| Comp. Ex. E1 | — | C |
| Comp. Ex. E2 | A | C |
| Comp. Ex. E3 | A | C |

What is claimed is:

1. A process for producing a heat-conductive sheet, comprising the steps of:

forming a sheeted composition from a curing composition for forming a heat-conductive sheet comprising a binder, a magnetic substance and a carbon fiber; and curing or semi-curing the sheeted composition while applying a magnetic field to the sheeted composition in its thickness direction so that the magnetic substance and the carbon fiber are oriented in the direction of the thickness of the sheeted composition.

2. The process as claimed in claim 1, wherein the magnetic substance is a magnetic particle.

3. The process as claimed in claim 1, wherein the magnetic substance adheres to the carbon fiber on its surface.

4. A process for producing a heat-conductive sheet, comprising the steps of:

forming a sheeted composition from a curing composition for forming a heat-conductive sheet comprising a binder, a magnetic substance and a carbon fiber, said binder containing a photocuring component and a thermocuring component; and photocuring the photocuring component of the sheeted curing composition while applying a magnetic field to the sheeted composition in its thickness direction so that the magnetic substance and the carbon fiber are oriented in the direction of the thickness of the sheeted composition, thereby obtaining a semi-cured heat-conductive sheet.

5. A process for producing a heat-conductive sheet, comprising the steps of:

forming a sheeted composition from a curing composition for forming a heat-conductive sheet comprising a binder, a magnetic substance and a carbon fiber, said binder containing (A) a copolymer whose glass transition temperature is −30° C. or below and (B) a monomer having an unsaturated bond; and curing the sheeted composition containing the unsaturated monomer (B) by exposure to light or by heating the composition while applying a magnetic field to the sheeted composition in its thickness direction so that the magnetic substance and the carbon fiber are oriented in the direction of the thickness of the sheeted composition, thereby obtaining a sheet having a sticky surface.

* * * * *